(12) United States Patent
Ghanchi et al.

(10) Patent No.: US 10,792,573 B2
(45) Date of Patent: Oct. 6, 2020

(54) ACCESSORY FOR VIRTUAL REALITY SIMULATION

(71) Applicant: Centurion VR, Inc., New York, NY (US)

(72) Inventors: Muhammad Yasser Ghanchi, New York, NY (US); Adam Amaral, Inglewood, CA (US); Glenn Snyder, Venice, CA (US); Roberto Josue Meza, Venice, CA (US); John Thomas LaViola, Jr., Venice, CA (US)

(73) Assignee: Centurion VR, Inc., New York, NY (US)

( * ) Notice: Subject to any disclaimer, the term of this patent is extended or adjusted under 35 U.S.C. 154(b) by 0 days.

(21) Appl. No.: 16/403,876

(22) Filed: May 6, 2019

(65) Prior Publication Data
US 2019/0255445 A1    Aug. 22, 2019

Related U.S. Application Data

(63) Continuation of application No. 16/015,825, filed on Jun. 22, 2018, now Pat. No. 10,279,269.
(Continued)

(51) Int. Cl.
*A63F 13/812*    (2014.01)
*G06T 13/20*    (2011.01)
(Continued)

(52) U.S. Cl.
CPC .......... *A63F 13/812* (2014.09); *A63F 13/212* (2014.09); *A63F 13/213* (2014.09);
(Continued)

(58) Field of Classification Search
CPC ......... A63F 2300/8082; G06F 2111/18; G06F 3/011; H04M 2203/359
See application file for complete search history.

(56) References Cited

U.S. PATENT DOCUMENTS 5,189,630 A    2/1993    Barstow et al.
5,286,028 A    2/1994    Daugard
(Continued)

FOREIGN PATENT DOCUMENTS

AU    2017101339    11/2017
AU    2017101340    11/2017
(Continued)

OTHER PUBLICATIONS

Iponz, "NZ Application No. 753620 First Examination Report dated Feb. 3, 2020", 3 pages.
(Continued)

*Primary Examiner* — Omkar A Deodhar
(74) *Attorney, Agent, or Firm* — Strategic Patents, P.C.

(57) ABSTRACT

The present disclosure generally relates to virtual reality simulation, and more specifically, in some implementations, to devices, systems, and methods for use in a virtual reality sports simulation. A system for virtual reality simulation may include an accessory (e.g., one or more of a bat, a glove, or a helmet) for interacting with a virtual reality environment. The accessory may provide the user with haptic feedback that emulates sensations that the user would experience when playing a live-action sport to provide the user with a more meaningful and realistic experience when playing a virtual reality game. Further, virtual reality simulations disclosed herein may include incorporating data from a live-action event (e.g., a live-action sporting event) into a virtual reality environment to provide a user with a realistic experience.

20 Claims, 10 Drawing Sheets

Related U.S. Application Data

(60) Provisional application No. 62/678,058, filed on May 30, 2018, provisional application No. 62/678,227, filed on May 30, 2018, provisional application No. 62/523,674, filed on Jun. 22, 2017, provisional application No. 62/523,664, filed on Jun. 22, 2017, provisional application No. 62/523,659, filed on Jun. 22, 2017, provisional application No. 62/523,694, filed on Jun. 22, 2017.

(51) Int. Cl.
| | |
|---|---|
| *G06T 13/40* | (2011.01) |
| *A63F 13/285* | (2014.01) |
| *A63F 13/31* | (2014.01) |
| *A63F 13/428* | (2014.01) |
| *A63F 13/573* | (2014.01) |
| *A63F 13/65* | (2014.01) |
| *A63F 13/52* | (2014.01) |
| *A63F 13/245* | (2014.01) |
| *A63F 13/213* | (2014.01) |
| *A63F 13/54* | (2014.01) |
| *A63F 13/577* | (2014.01) |
| *A63F 13/212* | (2014.01) |
| *A63F 13/25* | (2014.01) |
| *G06F 3/01* | (2006.01) |

(52) U.S. Cl.
CPC .......... *A63F 13/245* (2014.09); *A63F 13/25* (2014.09); *A63F 13/285* (2014.09); *A63F 13/31* (2014.09); *A63F 13/428* (2014.09); *A63F 13/52* (2014.09); *A63F 13/54* (2014.09); *A63F 13/573* (2014.09); *A63F 13/577* (2014.09); *A63F 13/65* (2014.09); *G06F 3/011* (2013.01); *G06F 3/016* (2013.01); *G06T 13/20* (2013.01); *G06T 13/40* (2013.01); *A63F 2300/1043* (2013.01); *A63F 2300/69* (2013.01); *A63F 2300/8011* (2013.01); *A63F 2300/8082* (2013.01)

(56) References Cited

U.S. PATENT DOCUMENTS

| | | |
|---|---|---|
| 5,443,260 A | 8/1995 | Stewart et al. |
| 5,472,205 A | 12/1995 | Bouton |
| 5,526,479 A | 6/1996 | Barstow et al. |
| 5,671,347 A | 9/1997 | Barstow et al. |
| 5,685,782 A | 11/1997 | Lipps et al. |
| 5,728,006 A | 3/1998 | Teitell et al. |
| 5,741,182 A | 4/1998 | Lipps et al. |
| 6,204,862 B1 | 3/2001 | Barstow et al. |
| 6,217,444 B1 | 4/2001 | Kataoka et al. |
| 6,220,865 B1 | 4/2001 | Macri et al. |
| 6,224,493 B1 | 5/2001 | Lee et al. |
| 6,312,335 B1 | 11/2001 | Tosaki et al. |
| 6,767,282 B2 | 7/2004 | Matsuyama et al. |
| 6,793,585 B1 | 9/2004 | Miyamoto et al. |
| 7,094,164 B2 | 8/2006 | Marty et al. |
| 7,264,554 B2 | 9/2007 | Bentley |
| 7,635,301 B2 | 12/2009 | Ueshima |
| 7,646,934 B2 | 1/2010 | Hing et al. |
| 7,662,047 B2 | 2/2010 | Ueshima et al. |
| 7,736,242 B2 | 6/2010 | Stites et al. |
| 7,789,742 B1 | 9/2010 | Murdock et al. |
| 7,815,516 B1 | 10/2010 | Mortimer et al. |
| 7,854,656 B2 | 12/2010 | Sato et al. |
| 7,872,638 B2 | 1/2011 | Sato |
| 7,932,908 B1 | 4/2011 | Ueshima et al. |
| 8,210,960 B1 | 7/2012 | Davenport |
| 8,248,367 B1 | 8/2012 | Barney et al. |
| 8,469,814 B2 | 6/2013 | Shimamura et al. |
| 8,512,162 B2 | 8/2013 | Kim et al. |
| 8,540,560 B2 | 9/2013 | Crowley et al. |
| 8,542,105 B2 | 9/2013 | Grant et al. |
| 8,542,907 B2 | 9/2013 | Zalewski et al. |
| 8,574,073 B2 | 11/2013 | Musa et al. |
| 8,698,736 B2 | 4/2014 | Birnbaum et al. |
| 8,734,214 B2 | 5/2014 | Hughes et al. |
| 8,814,641 B2 | 8/2014 | Rabin |
| 9,011,243 B2 | 4/2015 | Ohta et al. |
| 9,033,810 B2 | 5/2015 | Bentley |
| 9,061,212 B2 | 6/2015 | Kikuchi et al. |
| 9,185,361 B2 | 11/2015 | Curry |
| 9,233,294 B1 | 1/2016 | Coyle |
| 9,242,158 B2 | 1/2016 | Woo et al. |
| 9,283,457 B2 | 3/2016 | Thurman et al. |
| 9,333,412 B2 | 5/2016 | Jang et al. |
| 9,409,071 B1 | 8/2016 | Beno et al. |
| 9,501,158 B2 | 11/2016 | Okamura et al. |
| 9,542,011 B2 | 1/2017 | Huang et al. |
| 9,597,591 B2 | 3/2017 | Okamoto et al. |
| 9,616,328 B2 | 4/2017 | Song et al. |
| 9,656,140 B2 | 5/2017 | Thurman et al. |
| 9,674,435 B1 | 6/2017 | Monari et al. |
| 9,684,369 B2 | 6/2017 | Huang et al. |
| 9,737,817 B1 | 8/2017 | Ricky |
| 9,818,230 B2 | 11/2017 | Moravetz |
| 9,846,482 B2 | 12/2017 | Seth |
| 9,897,807 B2 | 2/2018 | Lavalle et al. |
| 9,901,776 B2 | 2/2018 | Mettler |
| 9,950,237 B2 | 4/2018 | Kline et al. |
| 9,962,576 B2 | 5/2018 | Anderson |
| 9,996,153 B1 | 6/2018 | Trotta |
| 9,999,804 B2 | 6/2018 | Goel et al. |
| 10,022,614 B1 | 7/2018 | Tran et al. |
| 10,025,386 B2 | 7/2018 | Keller et al. |
| 10,055,022 B2 | 8/2018 | Appleyard et al. |
| 10,071,281 B1 | 9/2018 | Loduca |
| 10,076,698 B2 | 9/2018 | Spivak et al. |
| 2002/0077189 A1 | 6/2002 | Tuer et al. |
| 2003/0040381 A1 | 2/2003 | Richings et al. |
| 2003/0109322 A1 | 6/2003 | Funk et al. |
| 2005/0054457 A1 | 3/2005 | Eyestone et al. |
| 2005/0148388 A1 | 7/2005 | Vayra et al. |
| 2005/0272517 A1 | 12/2005 | Funk et al. |
| 2006/0183546 A1 | 8/2006 | Addington et al. |
| 2006/0247070 A1 | 11/2006 | Funk et al. |
| 2006/0267944 A1 | 11/2006 | Rosenberg et al. |
| 2006/0287024 A1 | 12/2006 | Griffith et al. |
| 2007/0238539 A1 | 10/2007 | Dawe et al. |
| 2008/0261711 A1 | 10/2008 | Tuxen |
| 2009/0062027 A1 | 3/2009 | Sato |
| 2009/0143124 A1 | 6/2009 | Hughes et al. |
| 2009/0149256 A1 | 6/2009 | Lui |
| 2010/0068686 A1 | 3/2010 | Ueshima |
| 2011/0077065 A1 | 3/2011 | Sandoval et al. |
| 2011/0081968 A1 | 4/2011 | Mar |
| 2011/0121953 A1* | 5/2011 | Grant ................ A63F 13/285 340/407.1 |
| 2011/0164044 A1 | 7/2011 | Huang |
| 2011/0224012 A1 | 9/2011 | Hashimoto et al. |
| 2011/0300933 A1 | 12/2011 | Chien et al. |
| 2013/0095959 A1 | 4/2013 | Marty et al. |
| 2014/0180451 A1 | 6/2014 | Marty |
| 2014/0364208 A1 | 12/2014 | Perry |
| 2015/0157944 A1 | 6/2015 | Gottlieb |
| 2016/0026253 A1* | 1/2016 | Bradski ................ H04N 13/344 345/8 |
| 2016/0133230 A1 | 5/2016 | Daniels et al. |
| 2016/0314620 A1 | 10/2016 | Reilly et al. |
| 2017/0039881 A1 | 2/2017 | Belch et al. |
| 2017/0046967 A1 | 2/2017 | Sundquist et al. |
| 2017/0087409 A1 | 3/2017 | Sayo et al. |
| 2017/0151484 A1 | 6/2017 | Reilly et al. |
| 2017/0256066 A1 | 9/2017 | Richard et al. |
| 2017/0301140 A1 | 10/2017 | Smith et al. |
| 2018/0077976 A1 | 3/2018 | Keller et al. |
| 2018/0081436 A1 | 3/2018 | Keller et al. |
| 2018/0107277 A1 | 4/2018 | Keller et al. |
| 2018/0196262 A1 | 7/2018 | Cage |

(56) References Cited

U.S. PATENT DOCUMENTS

| | | |
|---|---|---|
| 2018/0236335 A1 | 8/2018 | Loduca |
| 2018/0261010 A1 | 9/2018 | Kudirka et al. |
| 2018/0369699 A1 | 12/2018 | Ghanchi |
| 2018/0373323 A1 | 12/2018 | Ghanchi et al. |
| 2019/0022492 A1 | 1/2019 | Takahashi et al. |
| 2019/0232173 A1 | 8/2019 | Ghanchi |
| 2019/0232174 A1 | 8/2019 | Ghanchi |
| 2019/0240584 A1 | 8/2019 | Ghanchi |
| 2019/0240585 A1 | 8/2019 | Ghanchi |

FOREIGN PATENT DOCUMENTS

| | | |
|---|---|---|
| ES | 2186587 | 3/2005 |
| KR | 101278592 | 6/2013 |
| KR | 101977964 | 5/2019 |
| KR | 101985463 | 6/2019 |
| WO | WO-2005039703 | 5/2005 |
| WO | WO-2007019441 | 2/2007 |
| WO | WO-2007096069 | 8/2007 |
| WO | WO-2011081470 | 7/2011 |
| WO | WO-2011119118 | 9/2011 |
| WO | WO-2012082072 | 6/2012 |
| WO | WO-2016189372 | 12/2016 |
| WO | WO-2017217050 | 1/2017 |
| WO | WO-2017126916 | 7/2017 |
| WO | WO-2017141166 | 8/2017 |
| WO | WO-2018030656 | 2/2018 |
| WO | WO-2018110722 | 6/2018 |
| WO | WO-2018122107 | 7/2018 |
| WO | WO-2018156542 | 8/2018 |
| WO | WO-2018/169111 | 9/2018 |
| WO | WO-2018161656 | 9/2018 |
| WO | WO-2018237256 | 12/2018 |

OTHER PUBLICATIONS

Graham, Peter, "This Week in VR Sport: An MR Project Analyzing Sporting Data and Sports Virtual Training Systems Announces QBSIM", https://www.vrfocus.com/2017/12/this-week-in-vr-sport-an-mr-project-analyzing-sporting-data-and-sports-virtual-training-systems-announces-qbsim/ Dec. 16, 2017 , 1 Page.
Lemire, Joe , "TrinityVR's DiamondFX Hitting Simulation Now in Use by Two MLB Clubs", https://www.sporttechie.com/trinityvr-diamondfx-hitting-simulation-virtual-reality-mlb/ Dec. 5, 2017 , 4 Pages.
KRON 4, "KRON 4 Tech Report: Virtual Baseball—Pitching Simulator Recreates Pro Experience", https://www.youtube.com/watch?v=f-QEvTaWoaM Oct. 8, 2013 , 1 Page.
Rakuten, "Pro Baseball Players Take a Swing at New VR Batting Simulator", https://rakuten.today/blog/virtual-reality-baseball-training-system.html Sep. 16, 2016 , 7 pages.
Kularatna, Shashitha , "Just Bat (VR Cricket)", https://store.steampowered.com/app/525950/JUST_BAT_VR_CRICKET/ Sep. 9, 2016 , 1 page.
Drambo, "Balls virtual reality cricket gameplay", https://www.youtube.com/watch?v=vX0PQF4S0TM Jun. 26, 2018 , 1 Page.
Chew, Jonathan , "Why Major League Baseball Teams are Turning to Virtual Reality", http://fortune.com/2016/04/29/mlb-eon-sports-vr/ Apr. 29, 2016 , 2 Pages.
The VR Shop, "The VR Shop—VR Cricket—Gear VR Gameplay", https://www.youtube.com/watch?v=Mgl67a1hXDU Apr. 4, 2018 , 1 Page.
Life VR, "Virtual Reality Cricket Game—Just Bat (VR)", https://www.youtube.com/watch?v=X_jdD5C5zGI Apr. 1, 2016 , 1 Page.
Gibsandpieces, "Cricket Simulator HOWZAT |VR Batting| HTC Vive VR", https://www.youtube.com/watch?v=cA3HTOGcyOM Mar. 23, 2017 , 2 Pages.

Koolonavich, N. , "This Week in VR Sport: Putting Fans Closer to the Experience", https://www.vrfocus.com/2018/03/this-week-in-vr-sport-putting-fans-closer-to-the-experience/ Mar. 17, 2018 , 4 Pages.
USPTO, "U.S. Appl. No. 16/015,825 Notice of Allowance dated Jan. 17, 2019", 7 pages.
USPTO, "U.S. Appl. No. 16/015,825 Notice of Allowance dated Mar. 19, 2019", 13 pages.
U.S. Appl. "U.S. Appl. No. 16/015,895 Non-Final Office Action dated Dec. 13, 2018", 14 pages.
USPTO, "U.S. Appl. No. 16/015,895 Notice of Allowance dated Mar. 5, 2019", 13 pages.
Beyond Sports, "Beyond Sports: VR Match Analysis", https://www.beyondsports.nl/products/vr-match-analysis , 3 Pages.
Lightweave, "Cricket VR", https://lightweave.co/portfolio-items/cricket-vr/ , 1 Page.
Eon Sports, "Eon Sports: Project Ops", http://eonsportsvr.com/product/pre-order-project-ops/ , 4 Pages.
Stickee, "natwest t20 blast: virtual reality cricket experience", https://www.stickee.co.uk/portfolio/natwest-t20-blast-virtual-reality-cricket-experience/ , 4 Pages.
ISA, "PCT Application No. PCT/US18/38978 International Search Report and Written Opinion dated Dec. 6, 2018", 19 pages.
ISA, "PCT Application No. PCT/US18/38978 Invitation to Pay Additional Fees and Partial International Search dated Sep. 24, 2018", 14 pages.
IB Cricket, "Play the World's Most Immersive Cricket—vSports Arcade", https://ib.cricket/vsport-arcades/pune/amanora-mall/ , 4 Pages.
Sports VTS, "Sports VTS: QBSIM", https://www.sportsvts.com/ , 10 Pages.
TrinityVR, "The Evolution of Sports Science", https://www.trinityvr.com/ , 7 Pages.
Stickee Technology Ltd, "Virtual Reality Cricket", http://virtualrealitycricket.club/ , 1 page.
Eon Reality, "VR Sports Training", https://www.eonreality.com/portfolio-items/vr-sports-training/ , 4 Pages.
IP Australia, "AU Application Serial No. 2018289561 Examination Report dated Oct. 2, 2019", 3 pages.
Sarkar, Ajay K. et al., "Cricket Bat Acceleration Profile from Sweet-Spot Impacts", Procedia Engineering, 34, Mar. 2, 2012 , pp. 467-472.
USPTO, "U.S. Appl. No. 16/381,694 Notice of Allowance dated Aug. 5, 2019", 12 pages.
USPTO, "U.S. Appl. No. 16/381,694 Non-Final Office Action dated May 16, 2019", 15 pages.
IP Australia, "AU Application No. 2018289561 Examination Report dated Dec. 2, 2019", 5 pages.
EPO, "EP Application No. 19204172.1 Extended Search Report dated Dec. 10, 2019", 7 pages.
WIPO, "PCT Application No. PCT/US18/38978 International Preliminary Report on Patentability dated Jan. 2, 2020", 13 pages.
Pakistan Patent Office, "Application Serial No. 284/2019 Office Action dated Feb. 10, 2020", 2 pages.
Republic of Bangladesh, "Appln Serial No. 116/2019 Examination Report dated Jul. 23, 2020", 1 page.
USPTO, "U.S. Appl. No. 16/381,868 Non-Final Office Action dated Jun. 1, 2020", 7 pages.
USPTO, "U.S. Appl. No. 16/381,892 Non-Final Office Action dated Jun. 8, 2020", 10 pages.
USPTO, "U.S. Appl. No. 16/381,907 Non-Final Office Action dated Jun. 9, 2020", 13 pages.
EPO, "EP Application No. 19204172.1 Examination Report dated Jun. 24, 2020", 4 pages.
EPO, "EP Appln Serial No. 18740465.2 Examination Report dated Jun. 29, 2020", 12 pages.

* cited by examiner

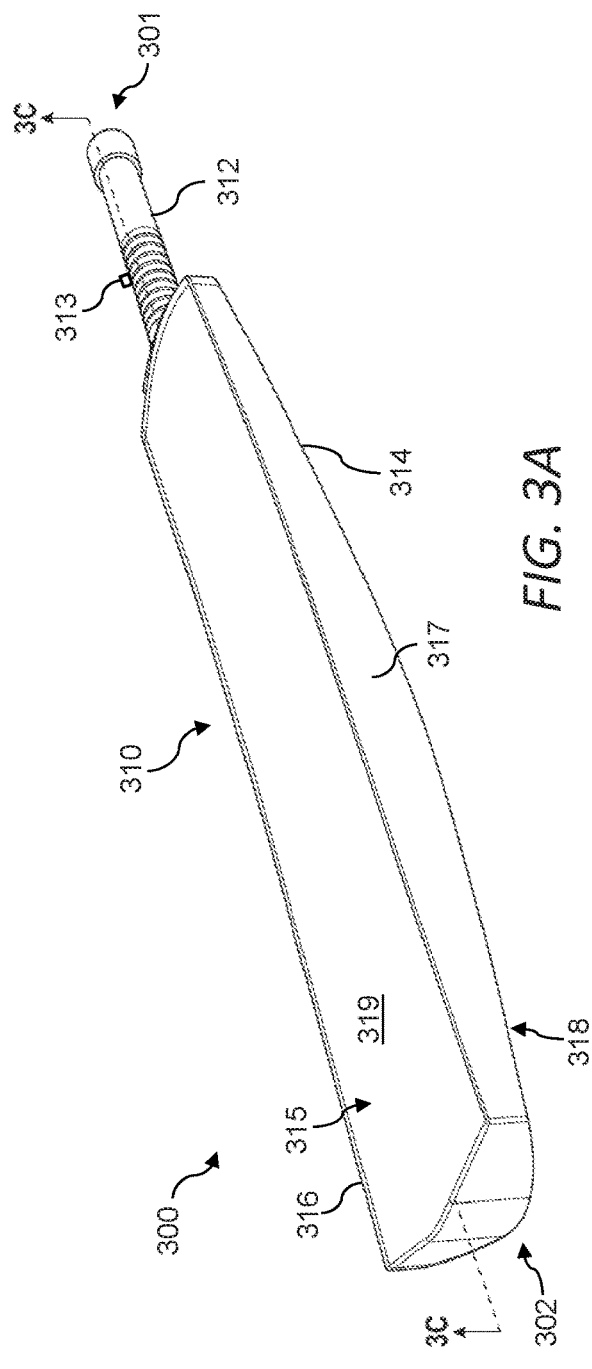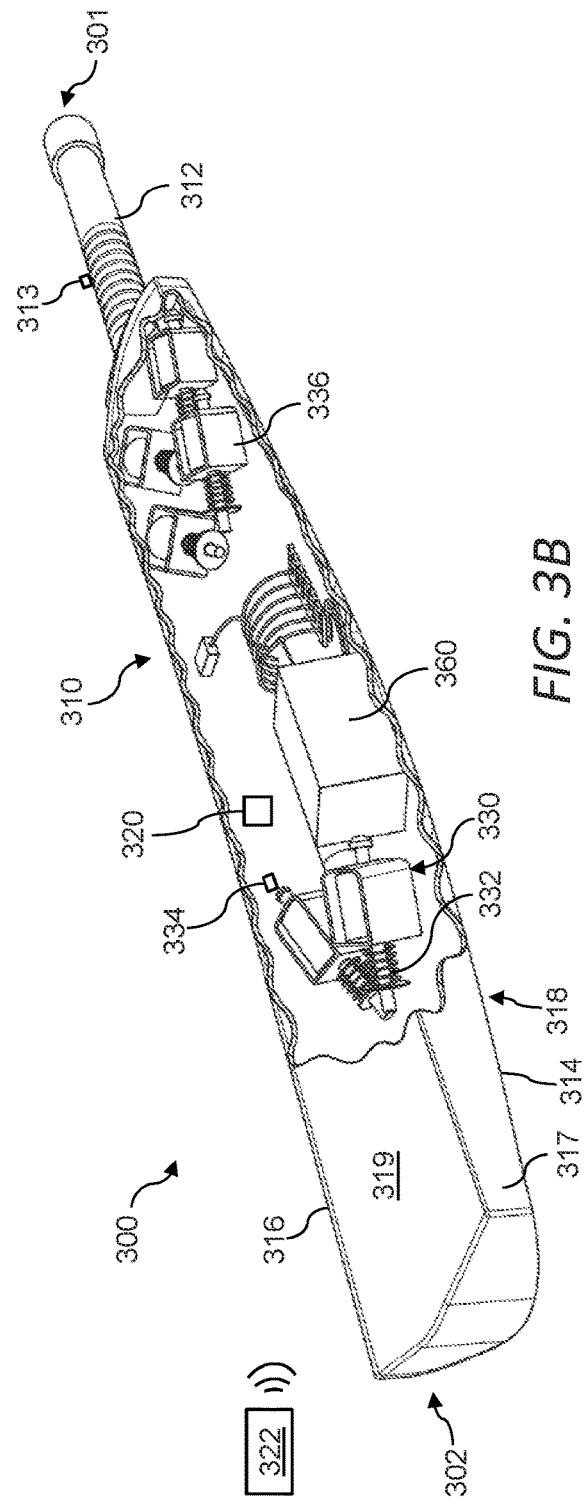
FIG. 3A
FIG. 3B

ACCESSORY FOR VIRTUAL REALITY SIMULATION

CROSS-REFERENCE TO RELATED APPLICATIONS

This application is a continuation of U.S. patent application Ser. No. 16/015,825, filed on Jun. 22, 2018, which claims priority to each of the following U.S. provisional patent applications: U.S. Provisional Patent Application No. 62/678,227, filed on May 30, 2018; U.S. Provisional Patent Application No. 62/678,058, filed on May 30, 2018; U.S. Provisional Patent Application No. 62/523,659, filed on Jun. 22, 2017; U.S. Provisional Patent Application No. 62/523,664, filed on Jun. 22, 2017; U.S. Provisional Patent Application No. 62/523,674, filed on Jun. 22, 2017; and U.S. Provisional Patent Application No. 62/523,694, filed on Jun. 22, 2017. Each of the foregoing applications is incorporated herein by reference in its entirety.

TECHNICAL FIELD

The present disclosure generally relates to virtual reality simulation, and more specifically, in some implementations, to devices, systems, and methods for virtual reality sports simulation.

BACKGROUND

Virtual reality simulation systems provide users with the perception of being physically present in a virtual reality environment. Users may interact with the virtual reality environment using hardware that provides feedback to the users. Through such feedback, virtual reality simulation systems may be used to simulate experiences such as sports. However, virtual reality simulations of sports have a limited capacity to provide a user with the realistic experience of live-action play of the sport being simulated. Thus, there remains a need for improved virtual reality simulation systems and techniques to provide a user with a more authentic experience.

SUMMARY

The present disclosure generally relates to virtual reality simulation, and more specifically, in some implementations, to devices, systems, and methods for use in a virtual reality sports simulation. A system for virtual reality simulation may include an accessory (e.g., one or more of a bat, a glove, or a helmet) for interacting with a virtual reality environment. The accessory may provide the user with haptic feedback that emulates sensations that the user would experience when playing a live-action sport to provide the user with a more meaningful and realistic experience when playing a virtual reality game. Further, virtual reality simulations disclosed herein may include incorporating data from a live-action event (e.g., a live-action sporting event) into a virtual reality environment to provide a user with a realistic experience.

In one aspect, an accessory for use in a virtual reality game disclosed herein may include a housing having a handle and a body extending from the handle, a tracking device operable to track a position of the housing and to communicate the position to a virtual reality environment in substantially real time, a plurality of solenoids disposed within the housing, and a controller in communication with the plurality of solenoids, the controller configured to receive information related to location-specific contact between virtual representations of the accessory and a projectile within a virtual reality environment and to selectively actuate one or more of the plurality of solenoids to exert, on the handle, force based on the location-specific contact.

The accessory may be a bat that includes a first end having the handle, a second end disposed away from the handle, a first surface bounded by a top edge and a bottom edge, and a second surface disposed opposite the first surface, where the first surface includes a face structurally configured to contact a ball. The location-specific contact between virtual representations of the bat and a ball within the virtual reality environment may be selected from one or more simulated contact scenarios including the ball striking the bat on (i) a tip of the bat defined by a distal end of the face disposed substantially adjacent to the second end of the bat, (ii) a base of the bat defined by a proximal end of the face disposed substantially adjacent to the handle, (iii) an upper contact area on or adjacent to the top edge of the bat, (iv) a lower contact area on or adjacent to the bottom edge of the bat, (v) a sweet spot on the face disposed between a centerline of the face and the distal end of the face, and (vi) a middle-hit area of the face disposed between the sweet spot and the proximal end of the face. One or more solenoids may be disposed adjacent to the second end of the bat and may be configured to actuate during simulated contact scenario (i). One or more solenoids may be disposed adjacent to the first end of the bat and may be configured to actuate during simulated contact scenario (ii). One or more solenoids may be disposed adjacent to the top edge of the bat and may be configured to actuate during simulated contact scenario (iii). One or more solenoids may be disposed adjacent to the bottom edge of the bat and may be configured to actuate during simulated contact scenario (iv). All solenoids in the plurality of solenoids may be configured to actuate in a low-power mode during simulated contact scenario (v), and all solenoids in the plurality of solenoids may be configured to actuate in a high-power mode during simulated contact scenario (vi). A physical arrangement of the plurality of solenoids within the housing may provide a predetermined force distribution for the location-specific contact between virtual representations of the accessory and the projectile within the virtual reality environment. A physical arrangement of the plurality of solenoids within the housing may provide a predetermined center of gravity for the accessory. Each of the plurality of solenoids may be positioned in a predetermined orientation. The predetermined orientation of at least one of the plurality of solenoids may be substantially normal to a plane of a face of the accessory. The accessory may further include a contact surface disposed adjacent to the at least one of the plurality of solenoids, where at least one of the plurality of solenoids is structurally configured to contact the contact surface when actuated. The predetermined orientation of at least one of the plurality of solenoids may have an axis of linear actuation of about 35 degrees offset from a plane of a surface of the accessory. The predetermined orientation may include at least two of the plurality of solenoids with respective axes of linear actuation at least 70 degrees opposed to one another and no more than 145 degrees offset from a plane of a surface of the accessory. The plurality of solenoids may include at least six solenoids. The accessory may include a first end having the handle and a second end disposed away from the handle, where at least two of the at least six solenoids are disposed adjacent to the first end of the accessory and at least another two of the at least six solenoids are disposed adjacent to the second end of the accessory. One or more of the plurality of solenoids may be disposed in the handle of the accessory. The handle may include a protrusion engaged with a solenoid for conveying haptic feedback to a user's hands when gripping the handle during exertion of the force based on the location-specific contact. The tracking device may be monitored by one or more lasers that perform predetermined sweeps of a physical space. Substantially real time may include a time delay of no more than 25 milliseconds. The accessory may further include a processor executing a virtual reality cricket game within the virtual reality environment, the processor configured to receive the position of the housing and render the position of the housing within the virtual reality environment in substantially real time. The housing may be weighted to provide a feel of a cricket bat. The housing and components included therein may be selected to have a weight between about 2.0 lbs and about 3.5 lbs. The housing may be made of one or more of carbon fiber and fiberglass. The accessory may further include one or more power sources within the housing in electrical communication with one or more of the plurality of solenoids and the controller.

In one aspect, a method of operating a virtual reality game disclosed herein may include: receiving projectile data including temporal data related to arrival of a virtual projectile within a predetermined volume adjacent to a virtual player in a virtual reality environment and spatial data related to a trajectory of the virtual projectile in the virtual reality environment; receiving accessory data including movement of an accessory in a physical space, the accessory data corresponding to movement of a virtual accessory of the virtual player within the virtual reality environment; determining, based on a comparison of the accessory data and the projectile data, a contact scenario between the virtual accessory and the virtual projectile within the virtual reality environment; and, based on the contact scenario, selectively actuating one or more solenoids coupled to the accessory to provide haptic feedback to a user grasping the accessory, the haptic feedback simulating contact between the accessory and a projectile.

The method may further include, when it is determined that the virtual accessory will contact the virtual projectile within the virtual reality environment, determining a contact location on the virtual accessory and a contact time based on the accessory data and the projectile data. Selectively actuating the one or more solenoids may further include defining a number of discrete contact scenarios characterizing contact between the virtual accessory and the virtual projectile within the virtual reality environment at a number of different locations on the virtual accessory and selectively actuating the one or more solenoids according to one of the number of discrete contact scenarios most closely corresponding to a contact location estimated within the virtual reality environment. The method may further include selecting audio feedback based on the contact scenario, determining timing for sending the audio feedback to a speaker to align with timing of the contact scenario, and transmitting the audio feedback to the speaker. The method may further include adjusting a trajectory of the virtual accessory based on additional tracked movement of the accessory. The method may further include simulating tracked movement of the accessory within the virtual reality environment. The method may further include displaying the virtual accessory and the virtual projectile on a display.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 3A is a perspective view of a bat of the system of FIG. 1.

FIG. 3B is a perspective view of a cutaway of the bat of FIG. 3A.

DETAILED DESCRIPTION

Figure 1:
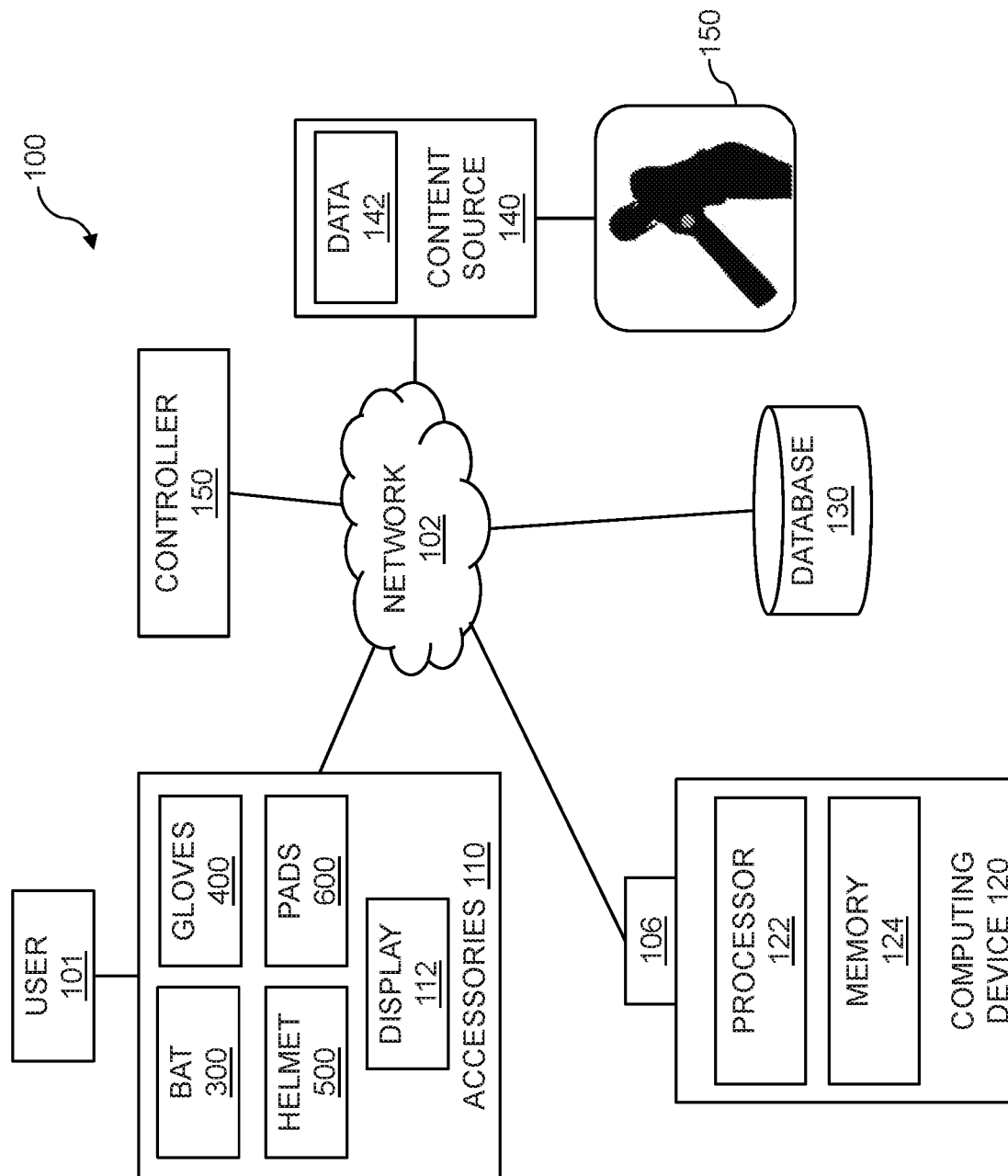
FIG. 1 is a schematic representation of a system for virtual reality simulation.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, for example, the term "or" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like.

Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "upper," "lower," and the like, are words of convenience and are not to be construed as limiting terms.

Described herein are devices, systems, and methods for virtual reality simulations in which a user may use one or more accessories tracked in a physical space to interact with a virtual reality environment. As used herein, a "virtual reality environment," shall be understood to include a simulated environment experienced by a user through one or more computer-generated sensory stimuli (e.g., sights, sounds, forces, and combinations thereof) and in which the user's reaction, in a physical space, to such sensory stimuli may result in changes in the simulated environment. In general, unless otherwise specified or made clear from the context, virtual reality environments may include any of various different levels of immersion for a user, ranging from complete immersion in computer-generated sensory stimuli to augmented reality environments including both virtual and real-world objects. As used herein, the terms "real-world," "physical world," "physical space," and variations thereof generally refer to a physical setting separate from computer-generated stimuli. Thus, for example, a physical space may include the three-dimensional space occupied by, or in the vicinity of, a user playing a virtual reality game or, further or instead, may include real-world events that occur in physical reality (e.g., apart from computer-generated stimuli associated with the virtual reality environment).

In general, the devices, systems, and methods of the present disclosure may be used to provide virtual reality simulations associated with a variety of different implementations in which real-world data of a moving object forms a basis of a graphical representation of the moving object in a virtual reality environment, and the user may interact with the graphical representation of the moving object in the virtual reality environment. In the disclosure that follows, these devices, systems, and methods are described with respect to virtual reality simulations of the sport of cricket, which has dynamic aspects that serve as useful contexts for describing challenges addressed by the devices, systems, and methods of the present disclosure. For example, cricket bowling techniques may exhibit greater variation as compared to a sport like baseball and, as described in greater detail below, implementations described herein may facilitate simulating such variations in a virtual reality environment. Thus, as described in greater detail below, certain implementations may be used to simulate a variety of bowlers and bowling techniques implemented in cricket, as well as bowlers of different quality, skill, physical abilities, and so on. Additionally, or alternatively, certain implementations may be used to simulate a variety of settings for playing cricket, where such settings may have an effect on cricket play.

The use of cricket in the description that follows should be understood to be by way of example and not limitation. That is, unless otherwise specified or made clear from the context, it will be understood that the devices, systems, and methods described herein may be applicable to virtual reality simulations of other sports, games, and activities, or more generally to any other type of simulation. Thus, unless a contrary intent is indicated or clear from the context, the devices, systems, and methods of the present disclosure may be used for virtual reality simulation of other sports such as baseball, softball, Wiffle® ball, fencing, tennis, badminton, squash, racquetball, soccer, table tennis, and so on. Further or instead, the devices, systems, and methods of the present disclosure may be used for virtual reality simulation in other gaming aspects such as first-person combat (e.g., fighting or shooting) games. Still further, or instead, the devices, systems, and methods of the present disclosure may be used for virtual reality simulation in any of various different training contexts, such as medical training in which the user may carry out a simulated medical procedure in the virtual reality simulation.

In certain implementations, virtual reality simulations described herein may be based on data from one or more live-action sequences. For example, data from a live-action sequence may be incorporated (e.g., in a raw form or in a manipulated form) into a virtual reality simulation in a virtual reality environment, where a user may experience situations that are based at least in part on (e.g., closely resembling) situations that are occurring, or that have occurred, in the live-action sequence.

As used herein, unless otherwise specified or made clear from the context, the term "live-action sequence" or variations thereof shall refer to any of various different combinations of movements, physical actions, or circumstances occurring in the physical world. In some instances, such live-action sequences may be temporally coupled to a virtual reality simulation, occurring substantially simultaneously (e.g., within a few seconds or minutes) or in near real time (e.g., within less than a few seconds) relative to corresponding activity in a virtual reality simulation. Further, or instead, such live-action sequences may be temporally decoupled from a virtual reality simulation, such as may be useful for providing the virtual reality simulation to a user "on-demand." In the context of the use of data from a live-action sequence of a sporting event, as described herein, the data may correspond to at least a portion of a non-simulated sporting event that is occurring, or that has occurred, in the physical world. This may include, for example, data recorded from a sporting event (e.g., through video recording, still-frame images, motion sensors, or a combination thereof).

It will thus be understood that the user(s) of devices, systems, and methods disclosed herein may include a human user seeking an immersive simulated experience (e.g., in a virtual reality sports simulation). This may include a user looking to experience a simulated activity without performing the activity in the physical world, e.g., because of lack of access to the activity or a parameter thereof (e.g., lack of a proper setting, lack of equipment, lack of requisite participants, and so on), or to mitigate the risk associated with the activity in question. The user may also or instead include a person interested in training or otherwise practicing or improving their skills for a particular simulated activity. In the context of sports, the user may include a person with varying skill levels or experience, e.g., a child, an adult, an amateur, a professional, and so on.

Referring now to FIG. 1, a system 100 may include one or more accessories 110, a computing device 120, a database 130, and a content source 140 in communication with one another (e.g., hardwired to one another, in wireless communication with one another, interconnected with one another over a data network 102, or a combination thereof). The content source 140 may include data 142 from a live action sequence 150. The database 130 may store the data 142 and, further or instead, other content useful for forming a virtual reality simulation. In use, the user 101 may interact with the system 100 through the accessories 110 (e.g., by wearing or wielding one or more of the accessories 110) to interact with a virtual reality environment provided by the computing device 120. For example, and as described in greater detail below, the accessories 110 may include one or more haptic devices to provide, to the user 101, force feedback emulating a real-world sensation that the user 101 would experience when playing a live-action sport corresponding to the type of simulated event. In this manner, the system 100 may create a relatively realistic experience for the user 101 of the system 100. For example, in the context of virtual reality sports simulation, the system 100 may create, for the user 101, an experience that more closely corresponds to the experience of playing a sport in the physical world. Further, and as described in greater detail herein, the system 100 may incorporate data 142 from the live action sequence 150 into the virtual reality environment, so that the user 101 may experience situations based at least in part on sequences from the live-action sequence 150.

As described herein, the system 100 may facilitate virtual reality simulation, and more specifically, in some implementations, virtual reality sports simulation. As discussed above, an example of a sport that may benefit from virtual reality sports simulation facilitated by the system 100 is the sport of cricket. To this end, one or more of the accessories 110 described herein may correspond to accessories typically used when playing cricket. For example, the accessories 110 may include one or more of a bat 300 (see, e.g., FIGS. 3A, 3B and 3C), one or more gloves 400 (see, e.g., FIGS. 4A and 4B), a helmet 500 (see, e.g., FIGS. 5A-5C), and one or more pads 600 (see, e.g., FIG. 6). It will be understood, however, that other accessories (e.g., specific to other sports or activities) are also or instead possible. It will be further understood that, unless otherwise indicated or made clear from the context, attributes of a particular instance of the accessories 110 discussed herein may also or instead be included on another, different instance of the accessories 110 discussed herein.

Figure 2A:
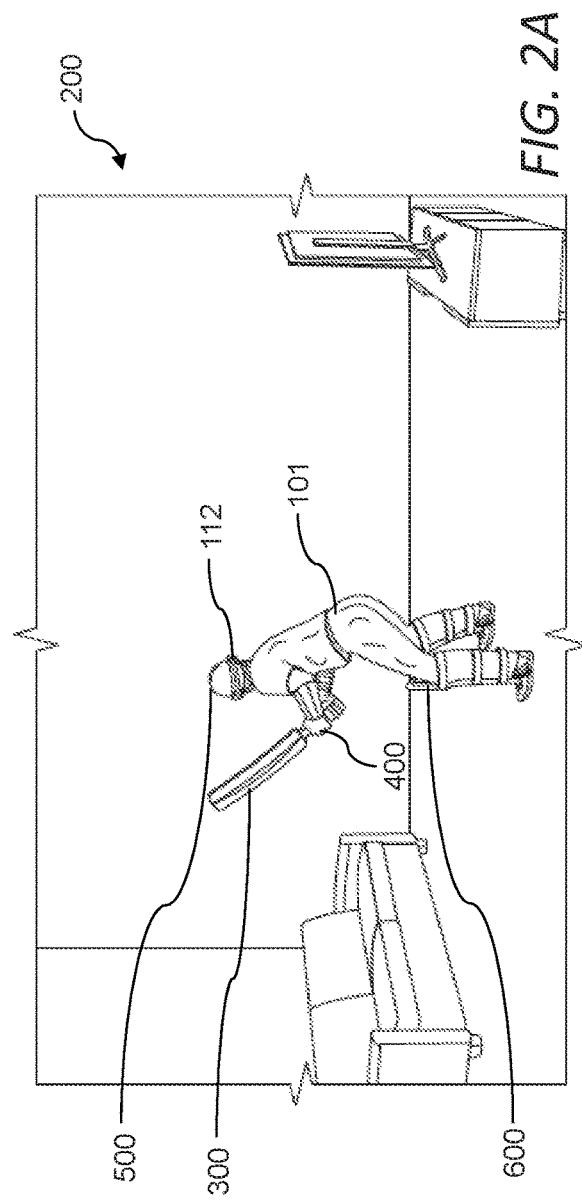
FIG. 2A is a schematic representation of a user of the system of FIG. 1 during a virtual reality simulation, with the user shown in the physical world.
Figure 2B:
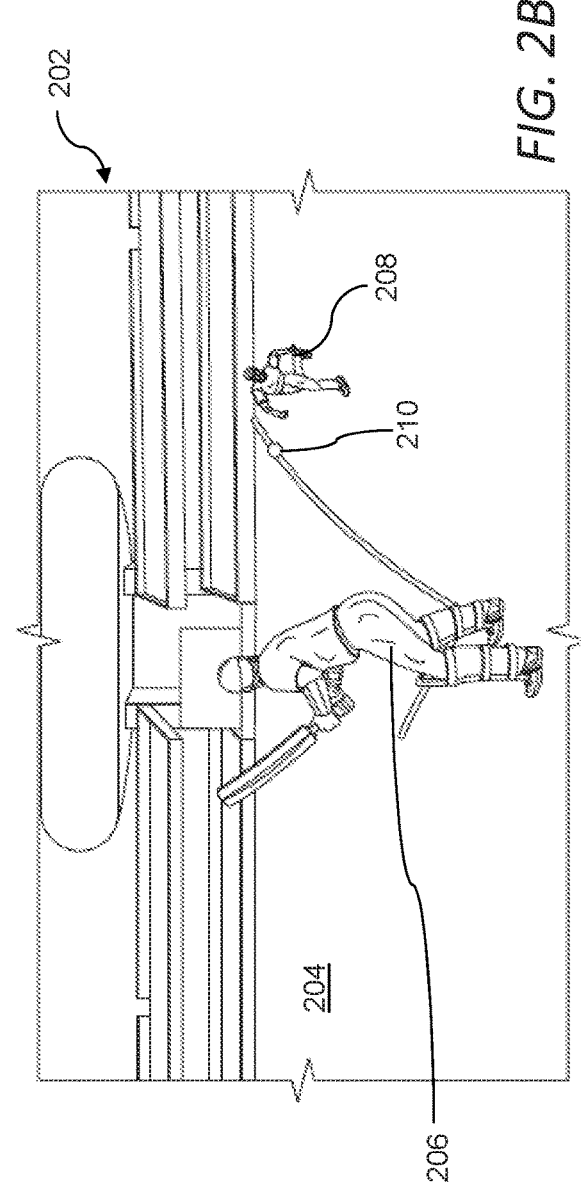
FIG. 2B is a schematic representation of a virtual reality environment for the virtual reality simulation of FIG. 2A.

Referring now to FIGS. 2A and 2B, the user 101 in a physical space 200 may use the system 100 (FIG. 1) to interact with a virtual reality environment 202 as part of a virtual reality cricket simulation. For example, the user 101 may interact with the system 100 (FIG. 1) in a relatively controlled environment, such as at home, in a training facility (e.g., a sports training facility such as a batting cage), in a gaming facility (e.g., an arcade), and so on. For such a virtual reality simulation to become an immersive, realistic experience for the user 101, the user 101 may interact with one or more of the accessories 110 described above to receive haptic or other sensory feedback associated with the simulated sequence.

As shown in FIG. 2B, the virtual reality environment 202 may include a setting 204 simulated to resemble an environment corresponding to a particular activity. For example, in the context of a virtual reality cricket simulation, the setting 204 may include one or more of an infield, an outfield, a boundary, a sky, a stadium, a lighting condition (e.g., whether it is daytime or nighttime), and a weather condition. Further, the virtual reality environment 202 may include virtual representations (e.g., simulations) of participants in a simulated activity. That is, a user 101 may view simulations of a playing field, a bowler, fielders, as well as other aspects of live play of the sport of cricket. For example, the virtual reality environment 202 may include one or more virtual players, such as a first virtual player 206 representing a cricketer that is batting (the batsman) and a second virtual player 208 representing a cricketer that is bowling to the batsmen (the bowler). It will be understood that more or fewer virtual players may be represented in the virtual reality environment 202. Further, or instead, one or more of the virtual players may be a virtual representation (e.g., a first-person virtual representation) of the user 101 (FIG. 2A). Alternatively, or additionally, the user 101 may be represented by another component or object of the virtual reality environment 202 (e.g., human or non-human, animate or inanimate). In certain instances, the user 101 may not be specifically represented within the virtual reality environment 202. In the example shown in FIG. 2B, the user 101 is represented within the virtual reality environment 202 as the first virtual player 206, and is represented as a batsman.

Referring now to FIGS. 1, 2A, and 2B, the system 100 may provide the user 101 with a three-dimensional, panoramic view including, for example, a first-person view of a bowler and a surrounding environment, where the surrounding environment may include one or more elements found in a game setting (e.g., a stadium). As described in greater detail below, the second virtual reality player 208 may be a simulation of a real-world bowler, with movements of the second virtual reality player 208 created by at least partially replicating real-life movements of a bowler from stored video of past bowling performances. For example, the second virtual reality player 208 may be a digitized avatar of a generic bowler, with simulated movements of the second virtual reality player 208 created by animating body joints of the avatar using techniques such as key-framing, motion capture, or a combination thereof.

To facilitate forming simulations described herein as immersive, realistic experiences for a user 101, it may be useful to provide the user 101 with relatively realistic force feedback corresponding to forces associated with the real-world activity being simulated. As described in greater detail below, such force feedback may be provided through one or more of the accessories 110. By way of example, when striking a bowled ball 210 in the virtual reality environment 202, the bat 300 wielded by the user 101 in the physical space 200 may provide the user 101 with the feeling of impacting the bowled ball 210, as if the impact occurred in the physical space 200. Continuing with this example, movement of one or more solenoids included in the bat 300, as described in further detail below, may transmit forces to hands of the user 101 gripping the bat 300. By way of further or alternative example, the system 100 may advantageously provide the user 101 with a physical stimulus in the physical space 200 when the user 101 is struck by a bowled ball 210 in the virtual reality environment 202. In certain implementations, it may be advantageous for the user 101 to experience the potential for being hit with a ball in the virtual reality environment 202. Thus, for example, the display 112 of the system 100 may represent hands or other portion of the body of the user 101 as the user 101 bats in the virtual reality environment 202, with the representations of one or more body parts of the user 101 in the virtual reality environment 202 providing the user 101 with a more realistic sensation of the potential for being struck (e.g., a user 101 may view a representation of one or more of their hands, head or helmet 500, hands or gloves 400, and so on). To facilitate presenting these and other realistic experiences to the user 101, the system 100 may generally include software, hardware, and accessories 110 operable in coordination with one another according to any one or more of the various different techniques described herein.

Additionally, or alternatively, the veracity of simulations described herein may benefit from including, in the virtual reality environment 202, one or more attributes mimicking the effects of the same attributes in the physical world. For example, in the context of cricket, certain bowlers may release a cricket ball such that the ball curves as the ball moves through the air—this is commonly referred to as "swing" in cricket—and the setting of the cricket match may affect this movement. By way of example, on a humid or cloudy day, a bowled ball 210 may be more likely to swing. These conditions may be commonly found in cooler-climates, such as the climates of England and New Zealand, and certain implementations described herein may be used to simulate such settings within the virtual reality environment 202. Further, certain implementations may to simulate a variety of conditions of a playing surface (referred to as the "pitch" in cricket). For example, a majority of balls in cricket hit the pitch before reaching the batsman, and thus the conditions of the pitch may play a significant role in the result of a bowled ball 210. For example, when a bowled ball 210 hits the pitch, the seam of the ball may react with the ground and create what is commonly referred to as "movement off the seam." By way of example, greener pitches (playing surfaces between a batsman and a bowler that include grass) or relatively damp pitches may increase the likelihood of creating such movement off the seam. Relatively drier pitches, such as those typically found in India and Pakistan, may be more amenable to creating movement of a bowled ball 210 using spin, with bowlers using this technique commonly referred to as "spin bowlers." In general, the system 100 may simulate one or more of the aforementioned conditions (and one or more other conditions or parameters) in the virtual reality environment 202 to achieve an immersive, realistic experience for the user 101.

Having provided an overall context for the system 100 and its use for virtual reality simulation, various aspects of the system 100 and techniques for forming immersive and useful virtual reality simulations using the system 100 will now be described. The description that follows is divided into sections describing hardware of the system 100 useful for forming the virtual reality environment 202 (I. HARDWARE), accessories useful for facilitating interaction between the user 101 and aspects of the virtual reality environment 202 (II. ACCESSORIES), and virtual reality simulations formed using the system 100 (III. SIMULATIONS). In general, it should be appreciated that these sections are presented for the sake of clarity of explanation and, unless otherwise specified or made clear from the context, these sections should not be considered to be limiting.

I. Hardware

As discussed above, the components of the system 100 shown for example in FIG. 1 may be connected to one another over a data network 102. The data network 102 may include any network(s) or internetwork(s) suitable for communicating data and control information among portions of the system 100. This may include public networks such as the Internet, private networks, telecommunications networks such as the Public Switched Telephone Network or cellular networks using third generation (e.g., 3G or IMT-2000), fourth generation (e.g., LTE (E-UTRA)) or WiMAX-Advanced (IEEE 802.16m) and/or other technologies, as well as any of a variety of corporate area or local area networks and other switches, routers, hubs, gateways, and the like that might be used to carry data among portions of the system 100. The data network 102 may thus include wired or wireless networks, or any combination thereof. One skilled in the art will also recognize that the components shown in the system 100 need not be connected by a data network 102, and thus may work in conjunction with one another, independently of the data network 102.

Communication over the data network 102, or other communication between components of the system 100, may be facilitated via one or more instances of a communications interface 106. The communications interface 106 may include, or may be connected in a communicating relationship with, a network interface or the like. The communications interface 106 may include any combination of hardware and software suitable for coupling the components of the system 100 to a remote device (e.g., a computing device 120) in a communicating relationship through a data network 102. By way of example and not limitation, this may include electronics for a wired or wireless Ethernet connection operating according to the IEEE 802.11 standard (or any variation thereof), or any other short or long-range wireless networking components. This may include hardware for short-range data communications such as Bluetooth or an infrared transceiver, which may be used to couple into a local area network or the like that is in turn coupled to a data network 102 such as the Internet. This may also or instead include hardware/software for a WiMAX connection or a cellular network connection (using, e.g., CDMA, GSM, LTE, or any other suitable protocol or combination of protocols). Additionally, or alternatively, a controller 150 may control participation by the components of the system 100 in any network to which the communications interface 106 is connected, such as by autonomously connecting to the data network 102 to retrieve status updates and the like.

In general, the display 112 may provide the user 101 with a visual representation (e.g., using one or more graphical representations or computer-rendered scenes) of the virtual reality environment 202. The display 112 may present to the user 101 one or more of still images, video data, or a combination thereof. To this end, the display 112 may include one or more of a two-dimensional display or a three-dimensional display. In some aspects, the display 112 may present a first-person view of a virtual representation of the user 101 to the user 101. In certain implementations, the display 112 may be associated with one or more of the accessories 110, such as the helmet 500 (see, e.g., FIGS. 5A-5C) worn by the user 101 during a simulation and described in greater detail below. In some implementations, at least a portion of the display 112 is included on, or forms part of, another component of the system 100, such as the computing device 120.

The computing device 120 may include, or otherwise be in communication with, a processor 122 and a memory 124. While the computing device 120 may be integrally formed in some instances, it should be appreciated that the computing device 120 may be advantageously distributed (e.g., with the processor 122 and the memory 124 supported on different portions of the system 100) in some applications. In general, the processor 122 may process the data 142 received from the content source 140 and, additionally or alternatively, the memory 124 may store the data 142 in any one or more of various different forms (e.g., raw, processed, or a combination thereof). The computing device 120 may also or instead be used to control one or more components of the system 100, and it will thus be understood that aspects of one or more instances of a controllers 150 described herein may also or instead apply to the computing device 120 and vice-versa.

In general, the computing device 120 may include any devices within the system 100 to manage, monitor, communicate with, or otherwise interact with other components in the system 100. This may include desktop computers, laptop computers, network computers, gaming systems or devices, tablets, smartphones, wearable devices, or any other device that can participate in the system 100 as contemplated herein. In an implementation, the computing device 120 (or a component thereof, e.g., the processor 122 or the memory 124) is integral with another component in the system 100 (e.g., the controller 150 or the accessories 110).

In some aspects, the computing device 120 may include a user interface. The user interface may include a graphical user interface, a text or command line interface, a voice-controlled interface, and/or a gesture-based interface. In implementations, the user interface may control operation of one or more of the components of the system 100, as well as provide access to and communication with one or more of the components of the system 100.

The database 130 may include any one or more of various different types of databases known in the art, including data stores, data repositories, or other memory devices or systems as well as combinations of the foregoing. In some implementations, the memory 124 of the computing device may act as the database 130, or vice-versa. In general, the database 130 may store the data 142 in a raw or processed format. In addition to, or instead of, raw or processed forms of the data 142 from the content source 140 or a live-action sequence 150 as described below, the data 142 may include instructions for controlling one or more components of the system 100, such as computer code, external or third-party information processed or manipulated for use in a virtual reality simulation program (e.g., by the computing device 120), or combinations thereof.

As stated above, the content source 140 may include data 142 received from a live-action sequence 150. The live-action sequence 150 may include circumstances occurring in the physical world, such as a portion of a non-simulated sporting event that is occurring, or that has occurred, in the physical world. In this manner, data 142 from the live-action sequence 150 may include projectile data indicative of movement of a projectile launched by a player in the live-action sequence 150. Specifically, the data 142 may include information regarding a cricket ball in a cricket match such as location information, temporal information, spin information, speed information, or any one or more other types of information useful for presenting a trajectory of the cricket ball in the virtual environment 202. In some implementations, the data 142 may be suitable for inclusion in a virtual reality simulation program in a raw form (e.g., without further processing by the computing device 106). Alternatively, or additionally, the data 142 may be processed and/or manipulated before it is used as part of a virtual reality simulation or otherwise used in coordination with one or more components of the system 100 to carry out a virtual reality simulation. In some implementations, the data 142 is derived from recorded information from a sporting event, where the information is typically used by umpires/referees, broadcasters, coaches, players, and the like, to track the path or expected path of a ball to aid in making, challenging, or analyzing rulings on the field of play. For example, in the context of cricket, the data 142 may include information typically used to determine where a cricket ball would have struck if a batsman were not in the path of the ball. This data 142 may represent, in some instances, a starting-point for manipulation and incorporation into a system 100 as part of a virtual reality simulation.

The data 142 may be collected, stored, processed, or otherwise generally included on the content source 140. In some instances, the content source 140 may include a server with a memory storing the data 142, where such a server may provide an interface such as a web-based user interface for use of the data 142. The content source 140 may thus include a third-party resource.

The controller 150 may be electronically coupled (e.g., wired or wirelessly) in a communicating relationship with one or more of the other components of the system 100 and operable to control one or more of the other components of the system 150. In some aspects, the controller 150 may be part of another component of the system 150 (e.g., the computing device 120 or one or more of the accessories 110). Further, although one instance of the controller 150 is shown in FIG. 1, it will be understood that one or more different components of the system 100 may each include a respective instance of the controller 150, which may function independently or in a coordinated manner with one or more other components of the system 100 (e.g., with other instances of the controller 150). In general, the controller 150 may include, or otherwise be in communication with, an instance of the processor 122 and an instance of the memory 124, such as those shown in the figure as included on the computing device 120.

The controller 150 may include any combination of software and processing circuitry suitable for controlling the various components of the system 100 described herein including without limitation processors 122, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 150 may include processing circuitry with sufficient computational power to provide related functions such as executing an operating system, providing a graphical user interface (e.g., to the display 112), to set and provide rules and instructions for operation of a component of the system 100, to convert sensed information into instructions, and to operate a web server or otherwise host remote operators and/or activity through a communications interface 106 or the like. In certain implementations, the controller 150 may include a printed circuit board, an Arduino controller or similar, a Raspberry Pi controller or the like, a prototyping board, or other computer related components.

The processor 122 may include an onboard processor for one or more of the computing device 120 and the controller 150. The processor 122 may be any as described herein or otherwise known in the art. In an implementation, the processor 122 is included on, or is in communication with, a server that hosts an application for operating and controlling the system 100.

The memory 124 may be any as described herein or otherwise known in the art. The memory 124 may contain computer code and may store data 142 such as sequences of actuation or movement of one or more of the accessories 110 or other hardware of the system 100. The memory 124 may contain computer-executable code stored thereon that provides instructions for the processor 122 for implementation in the system 100, for example, for controlling one or more components in the system 100. Thus, the memory 124 may include a non-transitory computer readable medium having stored thereon computer executable instructions for causing the processor 122 to carry out any one or more of the methods described herein such as to carry out all or a portion of a virtual simulation.

II. Accessories

Having provided an overall context for a system 100 for virtual reality simulation, various implementations of the accessories 110 will now be described. Unless otherwise specified, or made clear from the context, it will be generally understood that each of the accessories 110 may be used as part of the system 100 to carry out various different aspects of the virtual reality simulations described herein. As described in greater detail below, the accessories 110 may be used for improving an experience of virtual reality simulation, particularly in the context of virtual reality sports simulation.

Figure 3C:
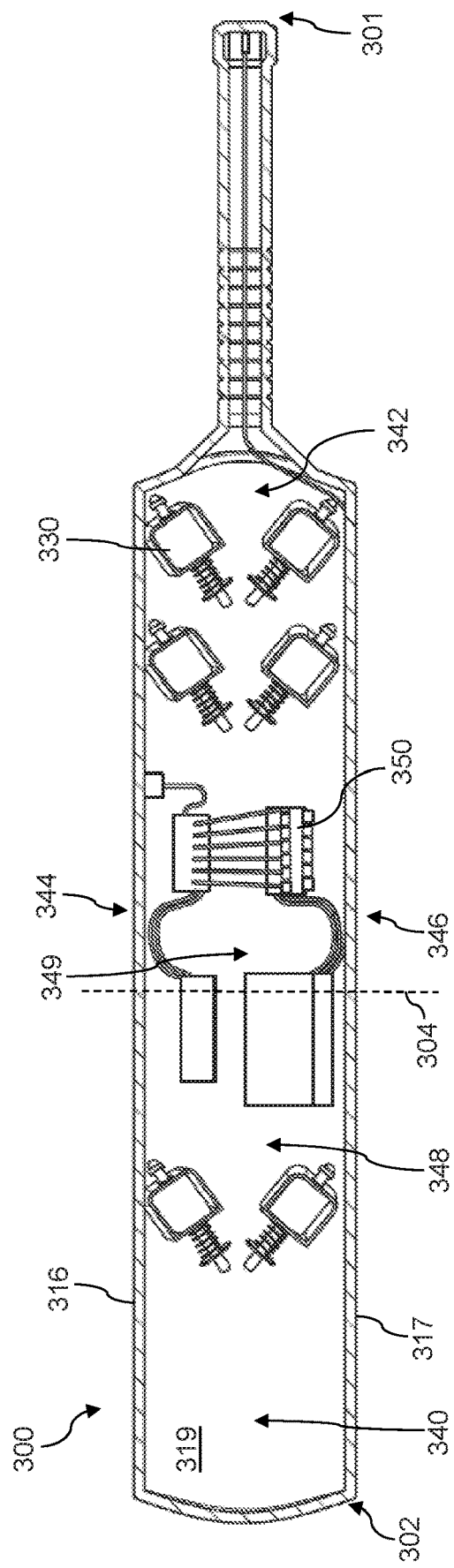
FIG. 3C is a top view of the cross-section of the bat of FIG. 3A taken along the line 3C-3C in FIG. 3A.

Referring now to FIGS. 3A, 3B, and 3C, as described herein, an accessory for use in a virtual reality simulation system or a virtual reality game may include a bat 300. Although this accessory is described herein as a bat 300 (and more specifically as a cricket bat), it will be understood that this accessory may also or instead include another device for a virtual reality simulation system where features thereof (e.g., components that facilitate haptic feedback) may be advantageous or desired. For example, the features of the bat 300 described herein may be included as part of an accessory including or representing a weapon (e.g., a sword), a baton, a stick, a club, and so forth. Similarly, although the bat 300 is described herein as providing haptic feedback to simulate contact with a projectile such as a ball (e.g., a cricket ball), the haptic feedback may also or instead simulate contact with other objects, projectiles, or otherwise, whether static or moving.

The bat 300 may include a housing 310 having a handle 312 and a body 314 extending from the handle 312, a tracking device 320, one or more solenoids 330 disposed within the housing 310, and a controller 350.

The bat 300 may be wielded by a user 101 in the physical world while the user 101 is participating in a virtual reality simulation. In use, and when held by the user 101, the bat 300 may simulate impact caused by a projectile striking the bat 300 (and vice-versa) without the bat 300 in the physical world ever striking such a projectile (e.g., the bat 300 may simulate the impact of a cricket bat striking a cricket ball during play in the physical world). The simulated impact may be provided through actuation of one or more of the solenoids 330, which in turn may cause the bat 300 to vibrate as a form of haptic feedback for a user 101 holding the bat 300. The haptic feedback provided by the bat 300 to the user 101 may vary based on a physical parameter of the bat 300 (such as the shape of the bat 300, the size of the bat 300, and the material of the bat 300), and/or a parameter of a contact event that occurs within a virtual reality environment 202. The contact event may include contact between virtual representations of the bat 300 and a projectile (e.g., a virtual representation of a cricket ball) within the virtual reality environment 202. In this manner, the haptic feedback provided by the bat 300 to the user 101 may represent one or more different simulated contact scenarios based on, for example, the location where a virtual representation of the bat 300 made contact with the virtual representation of a projectile, or other factors related to a contact event such as a speed of the virtual representation of the projectile, spin of the virtual representation of the projectile, speed of the bat 300 being swung by the user 101 (or a relationship between the speed of the bat 300 in physical world to the speed of the bat 300 in the virtual reality environment 202), an angle of the bat 300 being swung by the user 101 (or a relationship between the angle of the bat 300 in physical world to the angle of the bat 300 in the virtual reality environment 202), exit speed or exit angle of the virtual representation of the projectile after contact with the virtual representation of the bat 300, and so forth.

The bat 300 may generally include a size and shape that substantially resembles a typical cricket bat. For example, and as discussed above, the housing 310 may have a handle 312 and a body 314 extending from the handle 312, where the handle 312 is sized and shaped for holding by the user 101 and where the body 314 includes one or more surfaces configured for striking a projectile (e.g., a cricket ball). Specifically, the bat 300 may include a first end 301 having the handle 312, a second end 302 disposed away from the handle 312, a first surface 315 bounded by a top edge 316 and a bottom edge 317, and a second surface 318 disposed opposite the first surface 318. In some instances, the first surface 315 may include a face 319 structurally configured to contact a cricket ball and the second surface 318 may include one or more of a bulge, a swell, and a spline, where one or more of these features may be found on typical cricket bats.

The housing 310 may be made of similar materials relative to a typical cricket bat. For example, the housing 310 may be made of one or more of carbon fiber and fiberglass. The housing 310 may also or instead include wood or a composite material that resembles wood in one or more of appearance, feel, weight, and so on.

In general, the size of the bat 300 may resemble that of a typical cricket bat as discussed above. Thus, in certain implementations, the bat 300 may have a length of no more than about 38 inches (about 965 mm), a width of no more than about 4.25 inches (about 108 mm), an overall depth of no more than about 2.64 inches (about 67 mm), and edges of no more than about 1.56 inches (about 40 mm).

In some implementations, one or more portions of the bat 300 receive or otherwise cooperate with one or more parts of a third-party system, such as a video game system or a video game console. For example, the handle 312 of the bat 300 may define a void for inserting at least a portion of a video game controller or other component of a video game system.

The tracking device 320 may be operable to track a position of the housing 310 (e.g., a specific portion of the housing 310 or the bat 300 generally). The tracking device 320 may communicate the position to a virtual reality environment 202 (see, e.g., FIG. 2B) in substantially real time (e.g., having a time delay of no more than 25 milliseconds). To this end, the tracking device 320 may be monitored by one or more sensors 322 (e.g., external sensors such as one or more lasers that perform predetermined sweeps of a physical space where the bat 300 is being used). The tracking device 320 may work in conjunction with the controller 350 so that simulated movement of the bat 300 is provided within the virtual reality environment 202 in substantially real time based on information provided by the tracking device 320 in the physical world. As discussed herein, the bat 300 may represent one of the accessories 110 in the system 100 described with reference to FIG. 1, and thus the bat 300 may also or instead work in conjunction with one or more other components of that system 100. For example, the bat 300 may include a communications interface 106 to communicate with a processor 122 that is executing a virtual reality cricket game within a virtual reality environment 202, where the processor 122 is configured to receive a position of the housing 310 and to render the position of the housing 310 within the virtual reality environment 202 in substantially real time.

As discussed above, the bat 300 may include one or more solenoids 330 that are actuatable to provide force feedback to a user 101 of the bat 300. To that end, the controller 350, which may be the same or similar to any of the controllers described herein (e.g., the controller 150 of FIG. 1), may be in communication with the plurality of solenoids 330 for controlling actuation thereof. Specifically, the controller 350 may receive information related to location-specific contact between virtual representations of the bat 300 and a projectile (e.g., a virtual representation of a cricket ball) within the virtual reality environment 202 and to selectively actuate one or more of the plurality of solenoids 330 to exert a force based on the location-specific contact. The force exerted by one or more of the plurality of solenoids 330 may be directed on the housing 310 of the bat 300 such that a user 101 holding the handle 312 (or other portion) of the bat 300 feels the force as haptic feedback. Thus, in some implementations, the solenoids 330 may exert a force on the handle 312 of the bat 300 in a relative indirect manner (e.g., from the body 314 that is connected to the handle 312). Alternatively, one or more of the solenoids 330 may be positioned within the handle 312 of the bat 300, or may be coupled to the handle 312 of the bat 300, to directly apply a force to the handle 312.

The solenoids 330 may be positioned within the housing 310 in a predetermined arrangement, orientation, and general configuration so that one or more of the solenoids 330, when actuated, may provide haptic feedback to a user 101 of the bat 300 that simulates a predetermined contact scenario or event. Similarly, the number of solenoids 330 included within the housing 310, and the number of solenoids 330 that are actuated by the controller 350, may facilitate simulation of one or more specific, simulated contact scenarios. Each of these simulated contact scenarios may include, for example, a virtual representation of a ball striking a virtual representation of the bat 300 in a different location on the bat 300 or at a different simulated force or direction of impact, such that there is different haptic feedback provided to a user 101 for different location specific and/or force specific contact between virtual representations of the bat 300 and a ball within the virtual reality environment 202.

By way of example, one or more of the simulated contact scenarios may include simulation of a ball striking the bat 300 on (i) a tip 340 of the bat 300 defined by a distal end of the face 319 disposed substantially adjacent to the second end 302 of the bat 300, (ii) a base 342 of the bat 300 defined by a proximal end of the face 319 disposed substantially adjacent to the handle 312, (iii) an upper contact area 344 on or adjacent to the top edge 316 of the bat 300, (iv) a lower contact area 346 on or adjacent to the bottom edge 317 of the bat 300, (v) a "sweet spot" 348 on the face 319 disposed between a centerline 304 of the face 319 and the distal end of the face 319, and (vi) a middle-hit area 349 of the face 319 disposed between the sweet spot 348 and the proximal end of the face 319. Although these specific examples of predetermined contact scenarios are provided above, it will be understood that other contact scenarios are also or instead possible for simulation.

The solenoids 330 may be positioned within the housing 310 and specifically actuated to facilitate haptic feedback for a user 101 wielding the bat 300 for the above-identified exemplary simulated contact scenarios. For example, in certain implementations, one or more solenoids 330 may be disposed adjacent to the second end 302 of the bat 300 and are configured to actuate during simulated contact scenario (i) discussed above; one or more solenoids 330 may be disposed adjacent to the first end 301 of the bat 300 and are configured to actuate during simulated contact scenario (ii) discussed above; one or more solenoids 330 may be disposed adjacent to the top edge 316 of the bat 300 and are configured to actuate during simulated contact scenario (iii) discussed above; and one or more solenoids 330 may be disposed adjacent to the bottom edge 317 of the bat 300 and are configured to actuate during simulated contact scenario (iv) discussed above.

Simulated contact scenario (v) discussed above may represent an ideal contact event between a cricket bat and a cricket ball, such as contact made in the sweet spot 348 of the bat 300. Thus, in some aspects, all of the solenoids 330 in the plurality of solenoids 330 may be configured to actuate during this simulated contact scenario to alert a user 101 that they have made contact in the sweet spot 348 of a virtual representation of the bat 300. Also, in some implementations, one or more of the solenoids 330 may be configured to actuate in a plurality of different power modes, where a power mode corresponds to the force exerted by a solenoid 330. Some examples of such power modes may include a low-power mode and a high-power mode, where the low-power mode exerts less force than the high-power mode. To this end, in an implementation, all of the solenoids 330 may actuate in a low-power mode during simulated contact scenario (v) discussed above to create the feeling of a relatively smooth and desirous impact for the user 101. Similarly, because simulated contact scenario (vi) discussed above may represent a slight "mis-hit" contact event between a cricket bat and a cricket ball, in some aspects, all of the solenoids 330 in the plurality of solenoids 330 may be configured to actuate during this simulated contact scenario to alert a user 101 that such an event has occurred, but in a different power mode from simulated contact scenario (v)—e.g., a high-power mode such that the feedback is relatively jarring to a user 101 indicating the slight mis-hit. Other power modes are also or instead possible for actuation of the solenoids 330.

It will be understood that other arrangements for the solenoids 330, and other actuation techniques, sequences, and scenarios for the solenoids 330 are also or instead possible. However, in general, the physical arrangement of the plurality of solenoids 330 within the housing 310 may provide a predetermined force distribution for certain location-specific or force-specific contact between virtual representations of the bat 300 and a projectile within the virtual reality environment 202.

An example of a specific arrangement for the solenoids 330 is shown in FIGS. 3B and 3C. In general, the physical arrangement of the plurality of solenoids 330 within the housing 310 may provide a predetermined center of gravity for the bat 300 (e.g., one that substantially resembles the predetermined center of gravity for a typical cricket bat having a similar size and shape). Similarly, the housing 310 of the bat 300, with the plurality of solenoids 330 included therein, may be weighted to provide a relatively similar feel to a typical cricket bat having a similar size and shape (e.g., while holding the bat 300 and during a swing by the user 101). For example, a typical cricket bat may have a weight between about 2.0 lbs. and about 3.5 lbs., and thus the housing 310 and components included therein may be selected to have a cumulative weight between about 2.0 lbs. and about 3.5 lbs.

As discussed herein, each of the plurality of solenoids 330 may be positioned in a predetermined orientation (e.g., relative to one another or relative to one or more surfaces of the housing 310 of the bat 300). For example, the predetermined orientation of at least one of the plurality of solenoids 330 may be substantially normal to a plane of the face 319 of the bat 300. Also, or instead, the predetermined orientation of at least one of the plurality of solenoids 330 may be at a non-ninety-degree angle relative to a plane of the face 319 of the bat 300. Thus, one or more of the plurality of solenoids 330 may have an axis of linear actuation disposed at an angle between about 1-degree and about 89-degrees relative to a plane of the face 319 of the bat 300. For example, the predetermined orientation of at least one of the plurality of solenoids 330 may have an axis of linear actuation disposed at an angle of about 35 degrees offset from a plane of the face 319 of the bat 300 (or another surface of the bat 300). Also, or instead, at least one of the plurality of solenoids 330 may be disposed substantially level with a center plane of the bat 300. By way of further example, the predetermined orientation of the plurality of solenoids 330 may include at least two of the plurality of solenoids 330 having respective axes of linear actuation at least about 70 degrees opposed to one another and no more than about 145 degrees offset from a plane of the face 319 of the bat 300 (or another surface of the bat 300). Other arrangements and orientations are also or instead possible.

In some implementations, the number of the plurality of solenoids 330 includes at least six solenoids 330 as shown in FIGS. 3B and 3C. For example, at least two of the solenoids 330 may be disposed adjacent to the first end 301 of the bat 300 and at least another two of the solenoids 330 may be disposed adjacent to the second end 302 of the bat 300, where two other solenoids 330 are disposed therebetween. However, it will be understood that more than six solenoids 330 or less than six solenoids 330 are possible without departing from the scope of this disclosure, and the number, positioning, and orientation of the solenoids 330 may vary without departing from the scope of this disclosure.

Thus, in general, one or more of the solenoids 330 may be disposed within the body 314 of the housing 310 as described herein. However, one or more of the solenoids 330 may also or instead be disposed in another portion of the bat 300 such as the handle 312. Similarly, in some implementations, the handle 312 may include a protrusion 313 engaged with a solenoid 330 for conveying haptic feedback to a user's hands when the user is gripping the handle 312 during exertion of a force based on a location-specific contact event. Other mechanical or structural features are also or instead possible for inclusion on the bat 300 for conveying haptic feedback to a user's hands when the user is gripping the handle 312 during exertion of the force based on a location-specific or force-specific contact event.

Generally, one or more of the solenoids 330 may include a movable member 332, such as a movable arm, where movement of the movable member 332 facilitates haptic feedback as described herein. Thus, one or more of the solenoids 330 may include a linear actuator or similar. A movable member 332 of one or more of the solenoids 330 may be spring-loaded or otherwise biased such that, upon release, the movable member 332 extends or otherwise moves to create a force or vibration corresponding to haptic feedback. For example, the movable member 332, upon movement thereof, may impact a contact surface 334 causing vibration in the bat 300. The contact surface 334 may be a surface of the housing 310 or a separate surface disposed within the housing 310. Stated otherwise, in some implementations, the bat 300 may include a contact surface 334 disposed adjacent to at least one of the plurality of solenoids 330, where at least a portion of this solenoid 330 (e.g., a movable member 332 thereof) is structurally configured to contact the contact surface 334 when actuated. Also, or instead, movement of the movable member 332 itself may provide the force or vibration corresponding to haptic feedback (e.g., without contacting a surface of the bat 300).

Movement of the movable member 332 of a solenoid 330 may be facilitated by a motor 336 included on the solenoid 330 (e.g., a direct current motor). In certain implementations, one or more of the solenoids 330 is capable of providing about eight kilograms of force. However, because a typical cricketer may experience about 40-55 kilograms of force when batting, it will be understood that more powerful solenoids 330 are also or instead possible without departing from the scope of this disclosure.

The bat 300 may further include one or more power sources 360 within the housing 310 that are in electrical communication with one or more powered components of the bat 300 (e.g., one or more of the plurality of solenoids 330 and the controller 350). The one or more power sources 360 may include a battery (e.g., a rechargeable battery). For example, a power source 360 may include a wireless rechargeable battery that can be recharged using a short-range or long-range wireless recharging system. The power source 360 may also or instead be coupled to a port (e.g., a USB port) for connection to an electrical outlet or similar for charging.

Figure 4B:
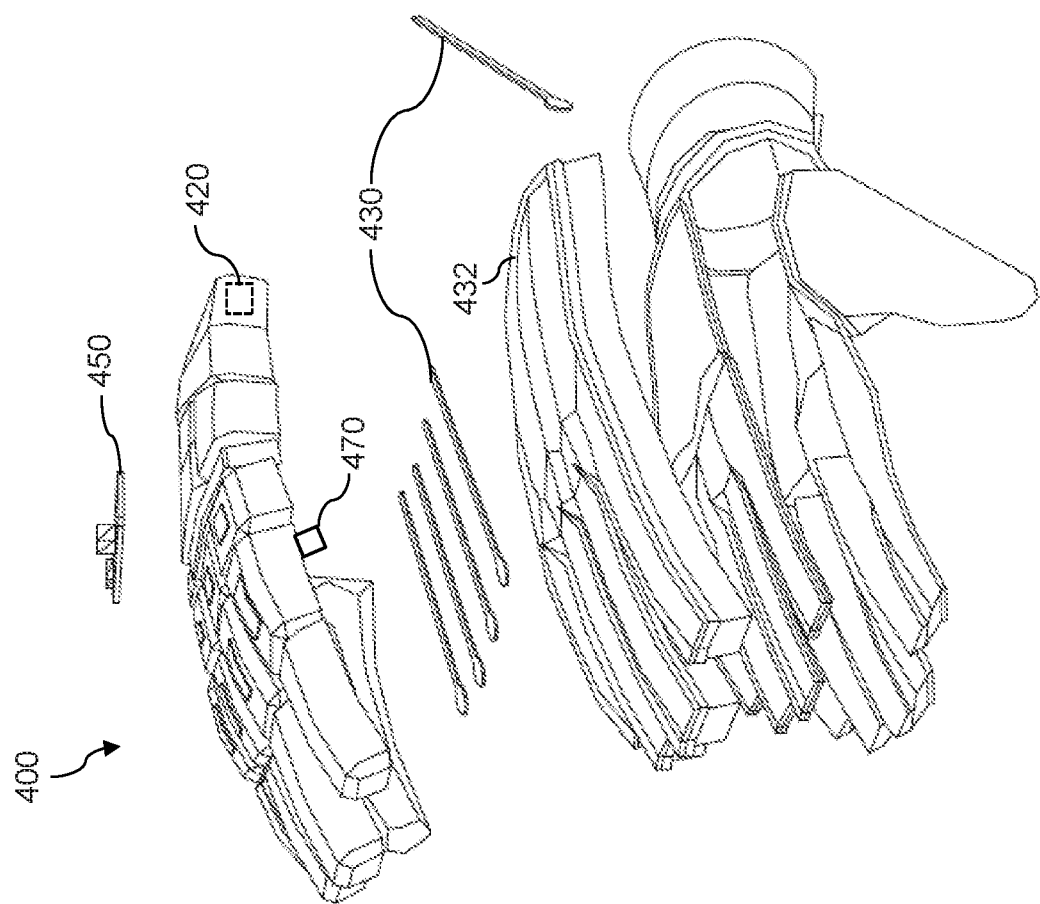
FIG. 4B is an exploded view of the glove of FIG. 4A.
Figure 4A:
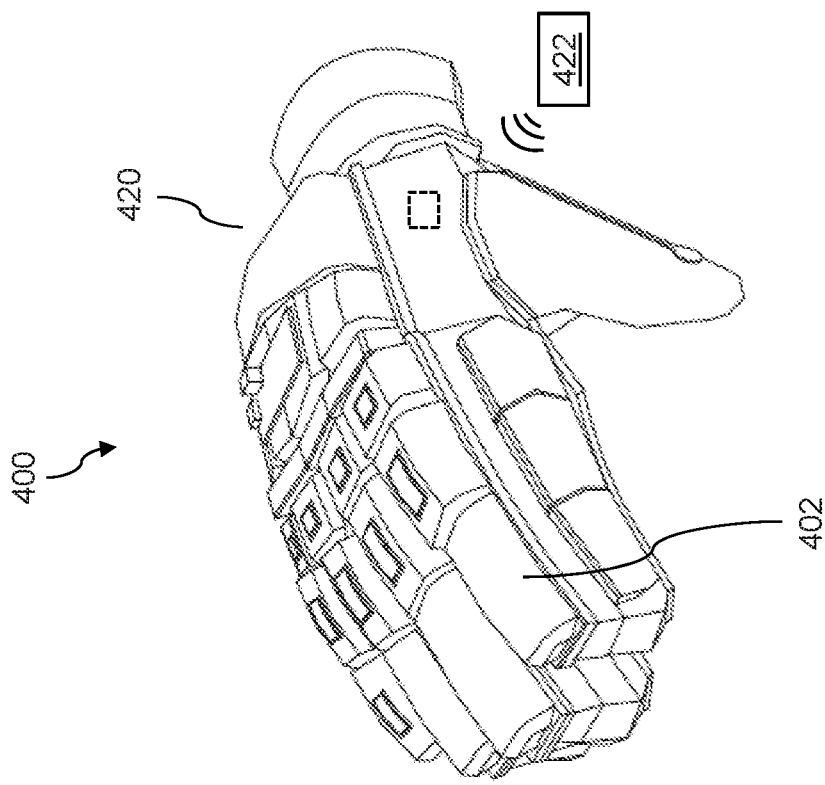
FIG. 4A is a perspective view of a glove of the system of FIG. 1.

Referring now to FIGS. 4A and 4B, an accessory for use in a virtual reality simulation system or a virtual reality game may include a glove 400. As described above, although this accessory is described herein in the context of a cricket simulation, it will be understood that this accessory may also or instead be adapted for use in other contexts.

The glove 400 may be sized and shaped to receive at least one portion of a hand of a user 101. For example, the glove 400 may be structurally configured to receive the entire hand of a user 101, or one or more fingers and the thumb of the user 101. The glove 400 may be adapted for use with a cooperating accessory, for example, another glove such that each of a user's hands are engaged with such accessories. The glove 400 may resemble a typical glove that is worn for protection, grip, and comfort by a cricket batsman. Thus, the glove 400 may include padding 402 disposed on or within at least a portion of the glove 400. Similar to other accessories described herein, the glove 400 may include a tracking device 420, one or more haptic feedback actuators 430, and a controller 450.

The tracking device 420 may be the same or similar to other tracking devices described herein (e.g., the tracking device 320 with reference to the bat 300 shown in FIGS. 3A, 3B, and 3C). In general, the tracking device 420 may be coupled to the glove 400 and operable to track a position of the glove 400 (e.g., to communicate the position to the virtual reality environment 202 in substantially real time). Thus, similar to the tracking device 320 of the bat 300, the tracking device 420 may be monitored by one or more sensors 422. As discussed herein, the glove 400 may represent one of the accessories 110 in the system 100 described with reference to FIG. 1, and thus the glove 400 may also or instead work in conjunction with one or more other components of that system 100. For example, the glove 400 may include a communications interface 106 to communicate with a processor 122 that is executing a virtual reality cricket game within the virtual reality environment 202, where the processor 122 receives a position of the glove 400 and renders the position of the glove 400 within the virtual reality environment 202 in substantially real time. In this manner, the virtual reality environment 202 may include a virtual representation of the glove 400 viewable by the user 101.

In some implementations, the glove 400 is flexible to grasp a bat, such as the bat 300 described above. To this end, the tracking device 430 may be configured to detect and communicate finger flexion, or thumb flexion, of the user 101 wearing the glove 400. The tracking device 430 may also or instead be configured to detect and communicate an orientation of the glove 400, or other position and movement information.

The one or more haptic feedback actuators 430 may be coupled to the glove 400 in a predetermined arrangement, where one or more of the haptic feedback actuators 430 are actuatable to transmit forces to at least one portion of the hand of the user 101 in the glove 400. Thus, in use, the haptic feedback actuators 430 may transmit a force to a wearer of the glove 400 to simulate a contact scenario that takes place within the virtual reality environment 202. The haptic feedback actuators 430 may be disposed in one or more locations of the glove 400. For example, the haptic feedback actuators 430 may be dispersed throughout different locations within the glove 400 corresponding to different regions of a user's hand when wearing the glove 400. This may include implementations where one or more haptic feedback actuators 430 are disposed along one or more portions of the glove 400 sized and shaped to receive a finger of a wearer, a thumb of a wearer, a palm of a wearer, a backside of a wearer's hand, and combinations of the foregoing.

The haptic feedback actuators 430 may include, or be formed on, an insert 432 disposed within the glove 400. The insert 432 may be disposed within padding 402 of the glove 400 or between layers of padding 402. To this end, the padding 402 may include a top layer and a bottom layer, with one or more haptic feedback actuators 430 disposed in-between these layers.

The controller 450 may be the same or similar to other controllers described herein. In general, the controller 450 may be in communication with the tracking device 420, one or more of the haptic feedback actuators 430, and a virtual reality environment 202 (FIG. 2B), for example, e.g., for controlling one or more aspects of one or more of these components. For example, the controller 450 may be configured to: receive, from the tracking device 420, a position of the tracking device 420; transmit the position of the tracking device 420 to the virtual reality environment 202; receive, from the virtual reality environment 202, an indication of force on a virtual glove (corresponding to the glove 400 in the physical world) in the virtual reality environment 202; and actuate one or more haptic feedback actuators 430 on the glove 400 to simulate the force on the virtual glove in the virtual reality environment 202.

By way of example, the indication of force on the virtual glove in the virtual reality environment 202 may correspond to a ball striking a bat being held by the hand of a user 101. In this manner, when such contact between a virtual bat and a virtual ball is made within the virtual reality environment 202, a user 101 in the physical world may feel a representative force in the glove 400 through actuation of one or more of the haptic feedback actuators 430. By way of further example, the indication of force on the virtual glove in the virtual reality environment 202 may also or instead correspond to a ball striking the glove 400. In this manner, when such contact between a virtual ball and a virtual glove is made within the virtual reality environment 202, a user 101 in the physical world may feel a representative force in the glove 400 through actuation of one or more of the haptic feedback actuators 430.

In some aspects, the glove 400 is the only accessory providing such haptic feedback. In other aspects, the glove 400 works in conjunction with one or more other accessories (e.g., the bat 300 described above) to provide a more realistic feel for the user 101. To this end, one or more of the haptic feedback actuators 430 may operate in coordination with one or more haptic devices on another accessory wielded by the user 101 (e.g., the solenoids 330 included on a bat 300 held by the user 101).

To differentiate between different simulated contact scenarios (e.g., a virtual ball striking a virtual bat or virtual glove), different haptic feedback actuators 430 may actuate and/or the haptic feedback actuators 430 may actuate in different power modes to create different feedback. Further, the glove 400 may facilitate feedback that is location specific or force specific within the glove 400 itself. For example, the haptic feedback actuators 430 may be disposed throughout different portions of the glove 400, such that certain haptic feedback actuators 430 in certain designated locations may be actuated depending upon the location of contact in a simulated contact scenario. Thus, one or more of the haptic feedback actuators 430 may be operable to adjust feedback based on a parameter in the virtual reality environment 202, where such a parameter may include one or more of a virtual bat selected by the user 101, a location on the virtual bat where a virtual ball makes contact in the virtual reality environment 202, a vertical displacement between the virtual bat and the virtual ball in the virtual reality environment 202, a location on the virtual glove where a virtual ball makes contact in the virtual reality environment 202, a force of impact, and so on. Similarly, one or more of the haptic feedback actuators 430 may be operable to adjust feedback based on an attribute of one or more of a virtual ball and a virtual bat in the virtual reality environment 202, where such an attribute may include one or more of ball speed, ball spin (if any), bat speed, bat angle, an exit speed of a bat held by the user 101, and an exit angle of the bat. Such an attribute for the virtual bat may directly correspond to motion and use of a bat 300 or other accessory in a physical space.

It will be understood that the glove 400 (and/or another accessory described herein) may also or instead include one or more other sensors 470. These sensors 470 may include one or more of the following: a force sensor, a contact profilometer, a non-contact profilometer, an optical sensor, a laser, a temperature sensor, a motion sensor, an imaging device, a camera, an encoder, an infrared detector, a weight sensor, a sound sensor, a light sensor, a sensor to detect a presence (or absence) of an object, and so on.

Figure 5A:
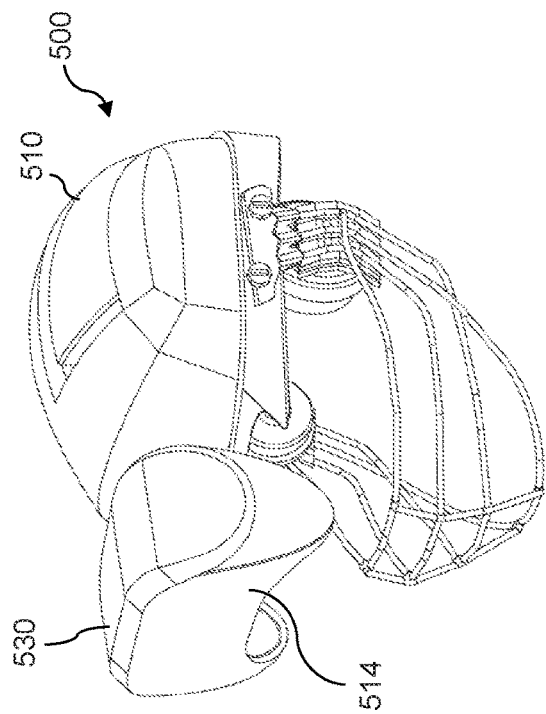
FIG. 5A is a perspective view a helmet of the system of FIG. 1, with a display of the helmet shown in a first position.
Figure 5B:
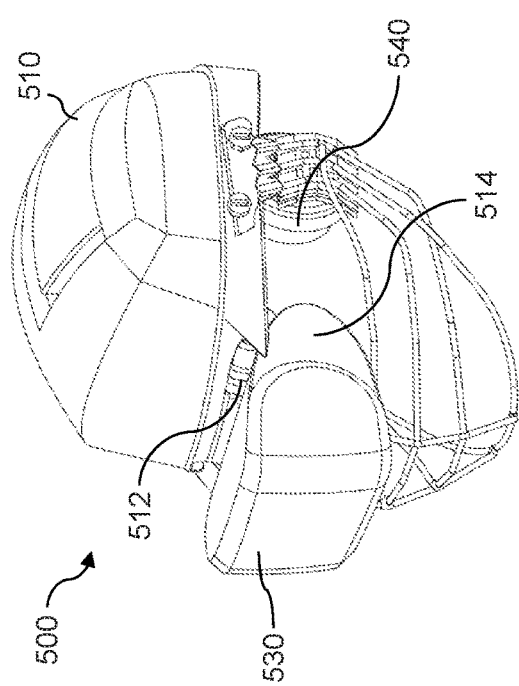
FIG. 5B is a perspective view of the helmet of FIG. 5A, with the display of the helmet shown in a second position.
Figure 5C:
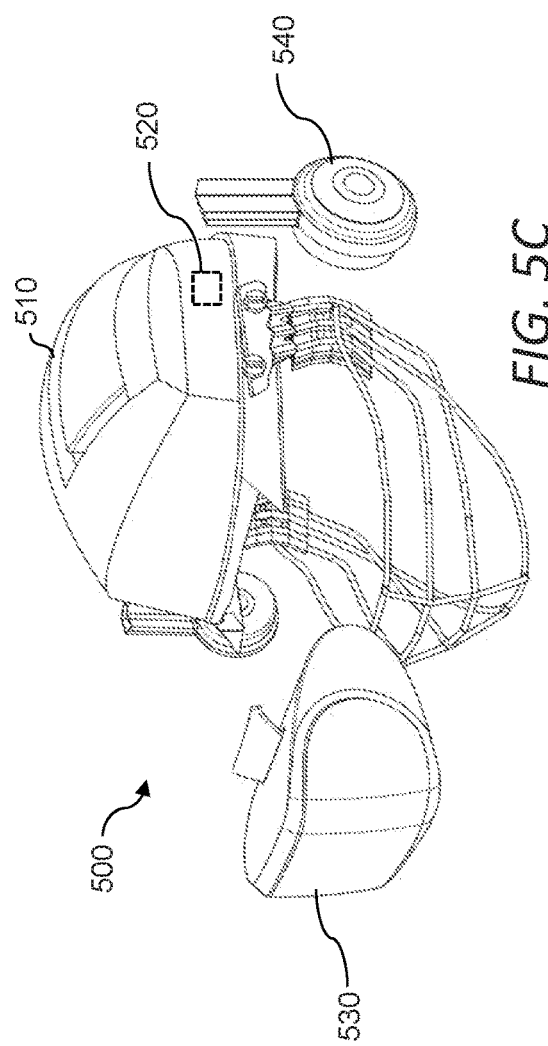
FIG. 5C is an exploded view of the helmet of FIGS. 5A and 5B.
Figure 6:
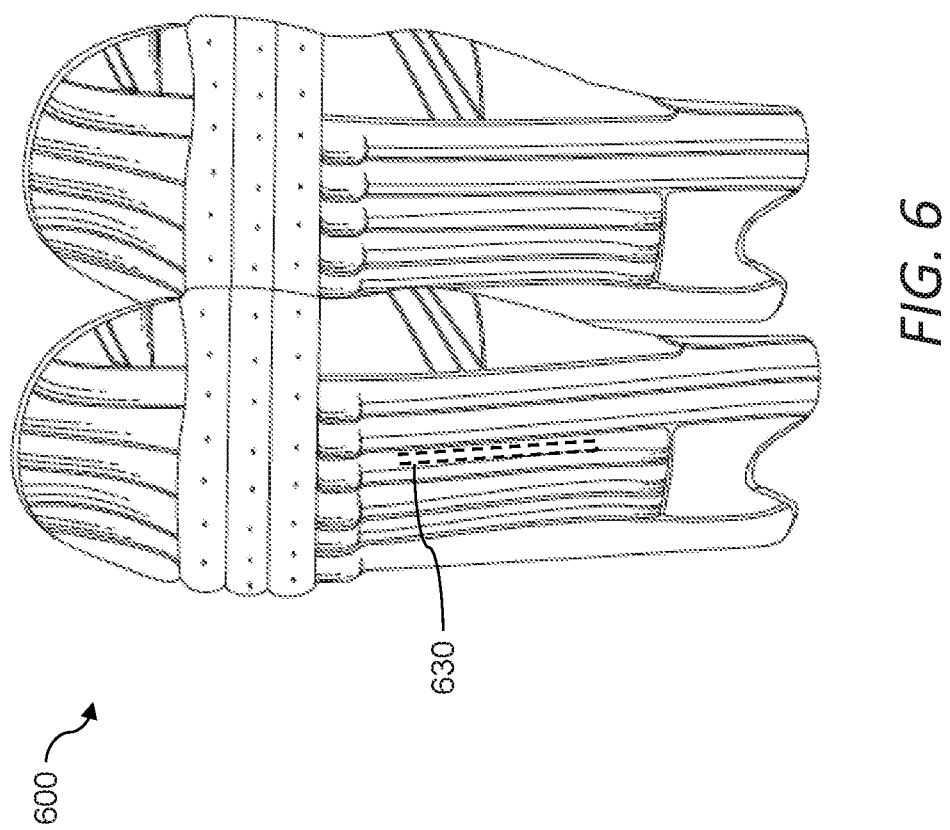
FIG. 6 is a schematic representation of pads of the system of FIG. 1.

Referring now to FIGS. 5A, 5B, and 5C, an accessory for use in a virtual reality simulation system or a virtual reality game may include a helmet 500. As described above, although this accessory is described herein in the context of a cricket simulation, it will be understood that this accessory may also or instead be adapted for use in other contexts.

The helmet 500 may include a shell 510 that is positionable about at least one portion of a head of a user 101, a display 530 coupled to the shell 510, an audio device 540 coupled to the shell 510, and a tracking device 520 coupled to the shell 510.

The shell 510 may be sized and shaped to substantially mimic, in both look and feel, a cricket batsman's helmet. That is, the shell 510 may resemble a real-world cricket helmet worn by a typical batsman for safety. For example, to more realistically provide a cricket gaming experience, the shell 510 may include an actual, real-world cricket helmet adapted to accommodate one or more of the display 530, the audio device 540, and the tracking device 520.

The display 530 may be the same or similar to any of the displays described herein or otherwise known in the art of virtual reality simulation. For example, the display 530 may be included on a virtual reality head mounted display (HMD) visor.

As shown in FIGS. 5A and 5B, the display 530 may be movable between different positions. For example, and as shown in FIG. 5A, the display 530 may be placed in a first position where the display 530 is viewable by a user 101 with the shell 510 positioned about at least a portion of the head of the user 101. And as shown in FIG. 5B, the display 530 may be placed in a second position where the display 530 is not obstructing at least part of a user's vision with the shell 510 positioned about at least a portion of the head of the user 101. To accommodate the display 530 being movable between different positions, the display 530 may be pivotable, slidable, extendable, and so on, relative to the shell 510. For example, and as shown in FIGS. 5A and 5B, the helmet 500 may include a pivoting joint 512 that couples the display 530 to the shell 510. More specifically, the helmet 500 may include a display mount 514 coupled to the shell 510 that is sized and shaped to receive the display 530 therein or thereon, where the display mount 514 includes or is otherwise coupled to a pivoting joint 512 or other connection (e.g., a hinge) facilitating movement of the display 510 relative to the shell 510. Thus, at least a portion of the display mount 514 may be movable relative to the shell 510. For example, the display mount 514 may be movable to place the display 510 in the first position shown in FIG. 5A and the second position shown in FIG. 5B, or other positions.

The display 530 may also or instead be removable and replaceable from the display mount 514, such as where the display 530 is included on a mobile computing device (e.g., a smartphone) and the mobile computing device is removably mountable to the helmet 500 via the display mount 514.

The audio device 540 may be operable to provide audio output from the virtual reality environment 202 to the user 101 with the shell 510 positioned about a portion of the head of the user 101. In some implementations, the audio device 540 includes headphones or earbuds. The audio device 540 may be integral with the shell 510.

The tracking device 520 may be the same or similar to any of the tracking devices described herein or otherwise known in the art of virtual reality simulation. In general, the tracking device 520 may be operable to track a position of the helmet 500, and to communicate the position to a virtual reality environment 202 in substantially real time. As discussed herein, the helmet 500 may represent one of the accessories 110 in the system 100 described with reference to FIG. 1, and thus the helmet 500 may also or instead work in conjunction with one or more other components of that system 100. For example, the helmet 500 may include a communications interface 106 to communicate with a processor 122 that is executing a virtual reality cricket game within the virtual reality environment 202, where the processor 122 is configured to receive a position of the helmet 500 and to render the position of the helmet 500 within the virtual reality environment 202 in substantially real time. In this manner, the virtual reality environment 202 may include a virtual representation of the helmet 500 viewable by the user 101. The tracking device 520 may be disposed on or within the shell 510 of the helmet 500.

It will be understood that the helmet 500 may also or instead include any of the features described above with reference to other accessories 110 in the system 100 described with reference to FIG. 1 or elsewhere in this disclosure. Thus, the helmet 500 may include sensors, solenoids or other haptic feedback devices, and so on.

In addition to the accessories described above for use in a virtual reality simulation system or a virtual reality game, which are set forth by way of example and not of limitation, other accessories are also or instead possible. One such accessory includes the pads 600 shown in FIG. 6. The pads 600 may include one or more of the features described herein that aid in a virtual reality simulation becoming more of an immersive, realistic experience for a user. For example, the pads 600 may include one or more haptic feedback actuators 630 that facilitate a user 101 to feel relatively realistic force feedback corresponding to forces that may be experienced when partaking in an activity in the real world that is being simulated in a virtual reality environment 202 (FIG. 2B).

In general, the pads 600 may include a wearable accessory, and although shown as typical padding that a cricket player might wear during a cricket match, it will be understood that other wearable accessories are contemplated herein. This may include other padding-type or add-on accessories, as well as more typical wearable clothes such as hats, pants, shirts, and so on.

In the context of a cricket simulation, one or more haptic feedback actuators 630 in the pads 600 may actuate to simulate a batsman being struck by a bowled ball (e.g., when such an instance occurs in a virtual environment as described herein).

III. Simulation

Having provided an overall context for a system 100 for virtual reality simulation (see, e.g., FIG. 1) and various hardware components that may be included in such a system (see, e.g., FIGS. 2A-6), various simulation techniques will now be described. It will be understood that the following virtual reality simulation techniques may be used for improving an experience of virtual reality simulation, and more particularly, for improving an experience of virtual reality sports simulation. To that end, it will be understood that one or more of the following virtual reality simulation techniques may be used in conjunction with one or more of the hardware accessories or other components described herein.

Figure 7:
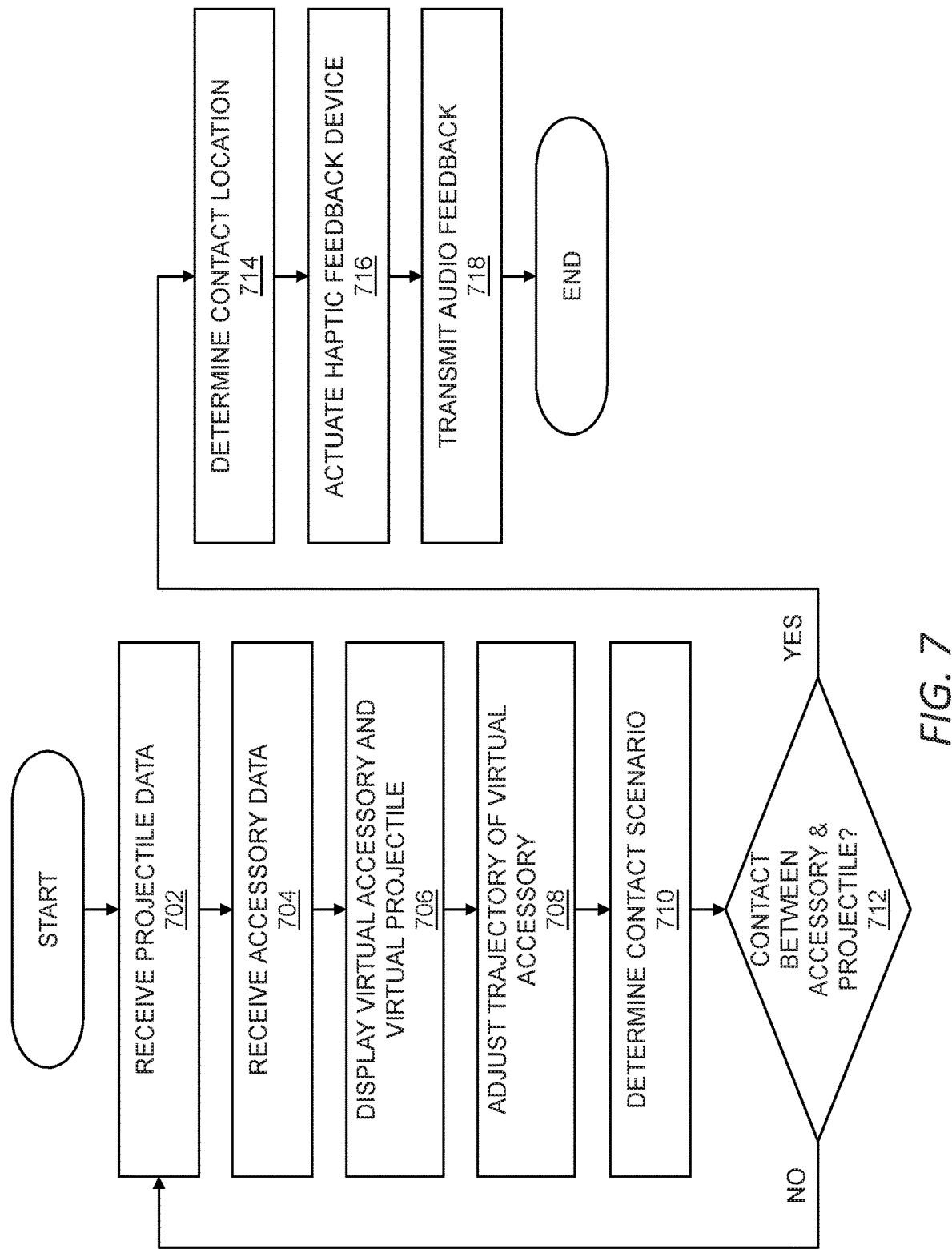
FIG. 7 is a flow chart of an exemplary method of operating a virtual reality game.

FIG. 7 is a flow chart of an exemplary method 700 of operating a virtual reality game. Unless otherwise specified or made clear from the context, it should be appreciated that the exemplary method 700 may be carried out using any one or more of the devices, systems, and methods described herein. Thus, for example, the exemplary method 700 may be carried out using the system 100 (see, e.g., FIG. 1) and, more specifically, may be carried out to create a realistic virtual reality simulation for an end user 101 incorporating one or more of the accessories 110 described herein (e.g., the bat 300 of FIGS. 3A-3C). It will thus be understood that, while the exemplary method 700 may emphasize use of a bat 300 as the accessory 110 being used, the exemplary method 700 may be adapted with any of the other accessories 110 discussed herein.

As shown in step 702, the exemplary method 700 may include receiving projectile data. The projectile data may be related to a virtual projectile within a virtual reality environment, which, as discussed in more detail below, may be directly or indirectly correlated to a real-world projectile in a live-action sequence. The projectile data may include temporal data related to the arrival of a virtual projectile within a predetermined volume adjacent to a virtual player in a virtual reality environment, and spatial data related to a trajectory of the virtual projectile in the virtual reality environment.

As shown in step 704, the exemplary method 700 may include receiving accessory data including movement of an accessory in a physical space (e.g., an accessory held by, worn by, or otherwise wielded by a user of a virtual reality simulation). The accessory data may correspond to movement of a virtual accessory of a virtual player within the virtual reality environment.

As shown in step 706, the exemplary method 700 may include displaying the virtual accessory and the virtual projectile on a display of a virtual reality simulation system (e.g., a display that is viewable by a user). The exemplary method 700 may also or instead include simulating tracked movement of the accessory within the virtual reality environment.

As shown in step 708, the exemplary method 700 may include adjusting a trajectory of the virtual accessory based on additional tracked movement of the accessory. Thus, for example, if a user adjusts movement of the accessory in the real-world, the virtual accessory of the virtual player within the virtual reality environment may be adjusted in a similar fashion.

As shown in step 710, the exemplary method 700 may include determining, based on a comparison of the accessory data and the projectile data, a contact scenario between the virtual accessory and the virtual projectile within the virtual reality environment. The contact scenario may be any of the simulated or predetermined contact scenarios discussed herein.

As shown in step 712, the exemplary method 700 may include determining whether the virtual accessory will contact the virtual projectile within the virtual reality environment. When it is determined that no contact is made, or will be made, between the virtual accessory and the virtual projectile within the virtual reality environment, the exemplary method 700 may include repeating one or more of the steps of receiving projectile data, receiving accessory day, and so on, until it is determined that there is or will be contact between the virtual accessory and a virtual projectile within the virtual reality environment. It will also be understood that other steps in the exemplary method 700 may still be performed, however, even when it is determined that no contact is made, or will be made, between the virtual accessory and the virtual projectile within the virtual reality environment, such as transmitting appropriate audio feedback (e.g., a sound of a projectile passing by a virtual player without making contact with the virtual accessory). When it is determined that contact is made, or will be made, between the virtual accessory and a virtual projectile within the virtual reality environment, the exemplary method 700 may continue to the remaining steps shown in the exemplary method 700.

As shown in step 714, the exemplary method 700 may include determining a contact location on the virtual accessory and a contact time based on the accessory data and the projectile data. This may also or instead include determining a contact force based on the accessory data and the projectile data.

As shown in step 716, the exemplary method 700 may include, based on the contact scenario, selectively actuating one or more haptic feedback devices (e.g., solenoids) coupled to the accessory to provide haptic feedback to a user grasping, wearing, or wielding the accessory. This haptic feedback may substantially simulate contact between the accessory and a projectile. Selectively actuating one or more haptic feedback devices may further include defining a number of discrete contact scenarios characterizing contact between the virtual accessory and the virtual projectile within the virtual reality environment at a number of different locations on the virtual accessory and selectively actuating one or more haptic feedback devices according to one of the number of discrete contact scenarios most closely corresponding to a contact location estimated within the virtual reality environment. The contact scenario may also or instead include a characteristic pertaining to a level of force characterizing contact between the virtual accessory and the virtual projectile within the virtual reality environment, and the exemplary method 700 may also or instead include selectively actuating one or more haptic feedback devices according to this level of force.

As shown in step 718, the exemplary method 700 may include selecting audio feedback based on the contact scenario, determining timing for sending the audio feedback to a speaker to align with timing of the contact scenario, and transmitting the audio feedback to the speaker. In certain implementations, each simulated contact scenario has an accompanying audio feedback selection. For example, a virtual projectile hitting a certain part of the virtual accessory may be accompanied by a different sound than the virtual projectile hitting a different part of the virtual accessory. The speaker may include one or more of the audio devices 540 discussed herein (e.g., with reference to the helmet 500).

As discussed herein, the present teachings may utilize data from a live-action sequence. As further discussed herein, the live-action sequence may be occurring in near real time relative to operation of the virtual reality environment, or the live-action sequence may be a recording (e.g., of a completed sporting event or similar).

In the context of cricket, a common approach for batsmen in real-world environments is to practice against live bowling or to use a mechanical machine to practice form and timing. However, these real-world approaches may be limited by the fact that every bowler's delivery has its own subtle characteristics that are typically not replicated by conventional tools and methods. While some simulations (e.g., video games) may replicate a general delivery type as described above and may use a generic avatar to simulate a bowler, the computer-generated deliveries of these bowlers may vary significantly from actual real-world bowlers. Also, the release point of bowler avatars may become relatively easy for a batsman to predict, thus not being reflective of randomness of different bowlers' real-world release points. So, while a user may become proficient at hitting a cricket ball in a typical video game environment, such practice does not often translate into success in real-world situations because the timing and release point recognition may be vastly different. Another approach typically used includes reviewing film (e.g., reviewing still shots or video footage of a particular bowler). However, it may be difficult to capture still shots and video footage from a batsman's perspective, and, as a result, traditional still shots and video footage may fail to provide a batsman with the immersive experience of facing a real-world bowler. Implementations described herein may improve upon the aforementioned deficiencies by facilitating more immersive, realistic experiences for users.

For example, certain implementations discussed herein may facilitate a first-person perspective of cricket balls that incorporate the actual delivery and trajectory of balls from real-world bowlers. In some aspects, a user may watch a digitized avatar of a real-world bowler perform their own bowling sequence with a simulated cricket ball delivered from the bowler's tracked release point that leaves the bowler's hand. Depending on the ball, data may be used to simulate a flight path (and spin rate, spin direction, and so on, as applicable) associated with a bowled ball in the real-world.

Figure 8:
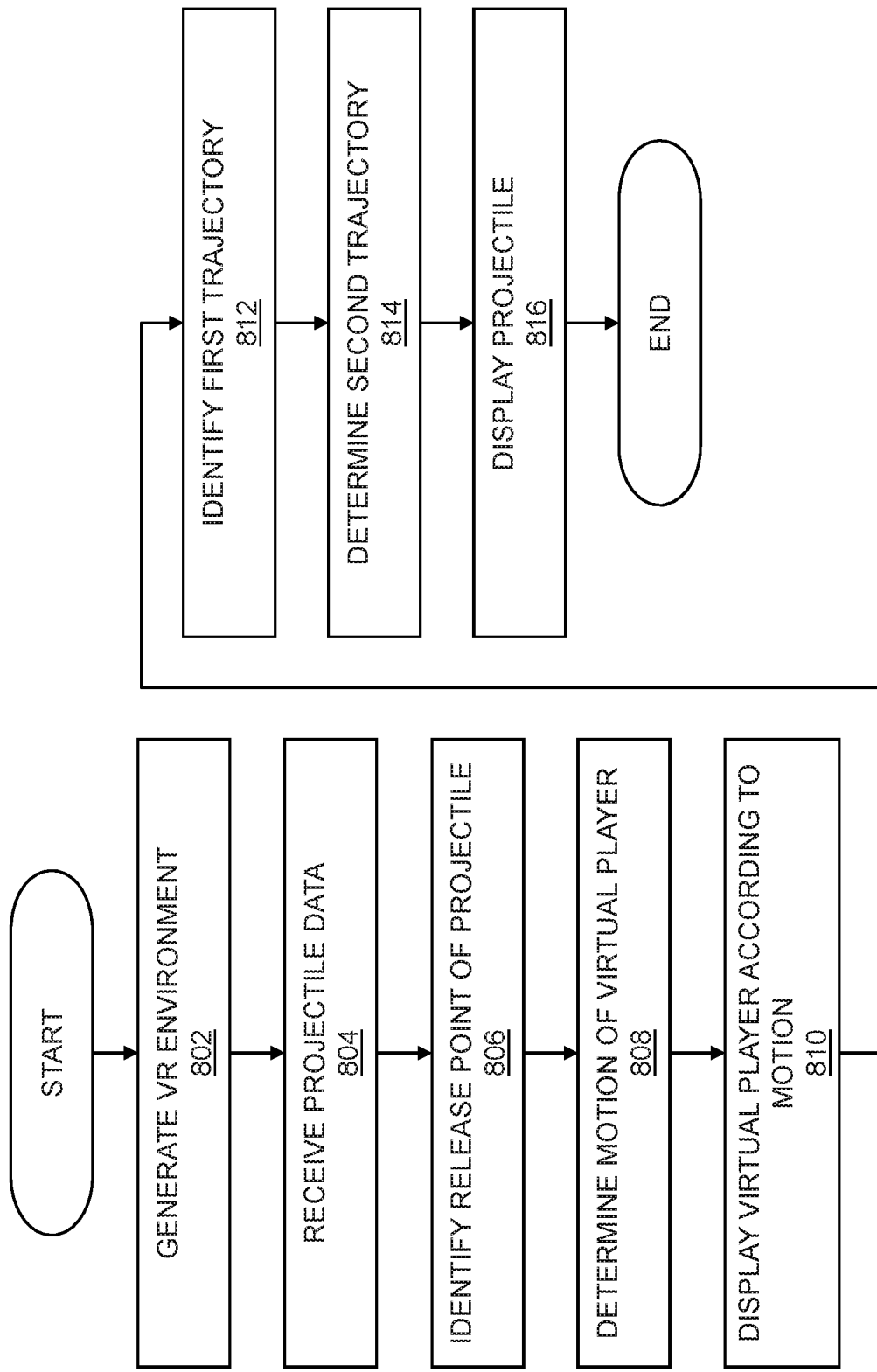
FIG. 8 is a flow chart of an exemplary method of virtual reality simulation.

FIG. 8 is a flow chart of an exemplary method 800 of virtual reality simulation (e.g., using data from a live-action sequence). Unless otherwise specified or made clear from the context, it should be appreciated that the exemplary method 800 may be carried out using any one or more of the devices, systems, and methods described herein. In general, the exemplary method 800 may include using data from a live-action sequence to select an appropriate representation of a virtual player based on the data. For example, if the data includes information regarding a certain bowled ball in a live-action cricket match, simply placing that data directly into a virtual reality simulation may result in a mis-matched virtual bowler relative to a virtual representation of that bowled ball. Thus, a virtual bowler should have a release point that corresponds to the actual release point of the ball in the live-action cricket match. Also, or instead, a virtual bowler should have an appropriate motion corresponding to the ball in the live-action cricket match—e.g., a slower release for a relatively slow bowled ball.

The exemplary method 800 may also or instead include altering or adjusting data from a live-action sequence for incorporation into a virtual reality simulation. This may include, for example, adjusting a trajectory of a virtual ball relative to the ball in the live-action cricket match based on a difference in parameters between the virtual reality environment and the physical setting from the live-action cricket match—e.g., different weather or a different type of pitch. This may also or instead include, for example, adjusting a trajectory of a virtual ball relative to the ball in the live-action cricket match based on a difference in parameters or attributes between one or more virtual players in the virtual reality environment and one or more live-action players from the live-action cricket match. For example, if a virtual batsman is batting in a different alignment or is using a different batting stance (e.g., a right-handed or a left-handed stance) that differs from a batsman to which the ball in the live-action cricket match was bowled, this information may be used to adjust the trajectory of the virtual ball. This may be done in the same or similar manner in which a bowler in the physical world would adjust the bowled ball's trajectory based on the differing attribute. By way of further example, a virtual batsman may also or instead have a differing physical attribute relative to a batsman to which the ball in the live-action cricket match was bowled (e.g., is shorter or taller), and this information may be used to adjust the trajectory of the virtual ball. Altering or adjusting data from a live-action sequence for incorporation into a virtual reality simulation may also or instead include reformatting the data, filling in gaps in the data, and/or reverse-engineering or otherwise manipulating the data so that it can be effectively used in the virtual reality simulation.

As shown in step 802, the exemplary method 800 may include generating a virtual reality environment including a virtual player in a setting. As discussed herein, the virtual reality environment may be configured for use in a virtual reality cricket simulation, where a projectile includes a cricket ball and the virtual player is a bowler.

As shown in step 804, the exemplary method 800 may include receiving projectile data indicative of movement of a projectile launched by a player in a live-action sequence. As discussed herein, in the context of cricket, the projectile data may include information regarding a bowled ball from a live-action cricket match, and thus the player in the live-action sequence may include a bowler in the live-action cricket match. The projectile data may include one or more discrete locations of the projectile before, during, or after the release of the projectile launched by the player in the live-action sequence. The projectile data may also or instead include a trajectory of the projectile, a speed of the projectile (e.g., an initial velocity of the projectile when released by the player or a velocity recorded downstream from the player, where the velocity may be provided as vectors in three-dimensional space), a spin of the projectile (if any), a release point of the projectile, a release angle of the projectile, at least one location of the projectile downstream from the player (e.g., at a mid-point between its release and a target), a target location of the projectile downstream from the player (e.g., where it hits a target, or where it would have hit a target if not intervened with), and so on. Also, or instead, some of the aforementioned datapoints may be calculated or estimated from other information included in the projectile data. For example, a spin of the projectile, if present, may be estimated from a trajectory and a speed of the projectile, and/or from contact between the projectile and a playing surface (e.g., by analyzing the resulting directional vectors of the projectile before and after contacting the playing surface).

The projectile data may also or instead include information pertaining to the player that launched the projectile in the live-action sequence. For example, the projectile data may include the distance covered in a player's delivery when bowling a ball in cricket (e.g., the distance of the player's "run-up"), the speed of one or more portions of the delivery (e.g., the speed of the run-up, pre-delivery stride, ball release, or follow though), whether the player has a "side-on" or "front-on" action, and so on.

As shown in step 806, the exemplary method 800 may include, based on the projectile data, identifying a release point of the projectile by the player in the live-action sequence. The release point may be included in the projectile data, such that identifying the release point includes simply reading the projectile data. Also, or instead, identifying the release point may include calculating the release point based on information in the projectile data (e.g., based on a trajectory of the projectile).

As shown in step 808, the exemplary method 800 may include determining a motion of the virtual player in the virtual reality environment based on the projectile data and the release point. For example, if the projectile data shows a relatively slow bowled ball, the motion of the virtual player may be determined to be relatively slow, or have a relatively short run-up in their delivery.

Determining the motion of the virtual player may include selecting one of a plurality of motions stored in a database (e.g., the database 130 of FIG. 1). These motions may include motions of avatars or video feeds of live-action sequences as described below in step 810. The selected motion from the plurality of motions may be selected to most closely match attributes of the projectile data or the determined motion. In some implementations, the attributes of the projectile data are weighted. For example, while it may be true that a cricket bowler typically bowls a ball slower to achieve greater spin, the projectile data may show that a certain cricket bowler in a live-action sequence may have achieved both relatively high spin and a relatively high velocity. In such circumstances, the velocity attribute may be weighted higher than the spin attribute, so that a selected motion demonstrates that a ball will be released at a relatively high speed. Also, or instead, if the projectile data includes information pertaining to the player that launches the projectile, that information may be weighted more than information pertaining to the projectile itself. In this manner, if the player concealed the pace of the projectile or the spin of the projectile during their delivery, the player's concealment in their delivery may be substantially replicated in the virtual reality environment, thereby providing a more realistic experience to a user.

As shown in step 810, the exemplary method 800 may include, on a display of the virtual reality environment viewable by a user, displaying the virtual player moving according to the motion and a graphical representation of the projectile moving according to a temporal series of locations of the projectile. Displaying the virtual player moving according to the motion may include presenting a first-person view of the virtual player on the display as described herein. Displaying the virtual player moving according to the motion may also or instead include presenting video data of the player from a live-action sequence. In this manner, the virtual player may more directly correspond to the player that launched the projectile in a live-action sequence. Displaying the virtual player moving according to the motion may also or instead include presenting an avatar. The avatar may be based off of a player in the physical world, such as where the avatar is created using one or more of key-framing and motion capture techniques of the player in the physical world.

As shown in step 812, the exemplary method 800 may include, based on the projectile data, identifying a first trajectory of the projectile. The first trajectory may include the actual trajectory of the projectile in the real-world.

As shown in step 814, the exemplary method 800 may include manipulating the first trajectory using one or more parameters to determine a second trajectory. Manipulating the first trajectory may include adding a curvature to the first trajectory. The curvature may be based at least in part on a spin of the projectile (if any), or a reaction of the projectile when contacting a playing surface. Adding curvature to the first trajectory may be accomplished by introducing a constant bi-directional drag force (in the x- and z-directions) on the projectile. This constant force may be based at least in part on one or more of spin, seam angle, velocity in the direction opposite to the drag vector, air density, cross-sectional area of the projectile, and a drag force coefficient. Manipulating the first trajectory may also or instead include interpolating between different paths for the projectile created using one or more projectile motion equations. For example, manipulating the first trajectory may include cubic spline interpolation between three-dimensional data points to generate third-order polynomial equations that simulate the trajectory of the projectile in three-dimensional space.

Manipulating the first trajectory may also or instead include changing a parameter of the projectile data. By way of example, such a parameter may include one or more of a release point of the projectile, a release angle of the projectile, an initial speed of the projectile when released by the player, and a location of the projectile downstream from the player. For example, manipulating the first trajectory may include changing the release angle of the projectile or the rotation/swing of the player, which in turn can change the effect of a drag force on the projectile.

As discussed herein, the parameter may be changed based on a difference between the live-action sequence and the setting of the virtual reality environment. Thus, the exemplary method 800 may include altering a path of the graphical representation of the projectile in the virtual reality environment from a trajectory included in the projectile data based on one or more predetermined parameters that differ between the live-action sequence and the setting of the virtual reality environment. By way of example, such a difference between the live-action sequence and the setting of the virtual reality environment may include one or more of a playing surface, weather, lighting, time of day or time of year, climate or altitude (e.g., for air density), a physical attribute of a user (e.g., a height of the user for displaying the user as a batsman in a virtual reality cricket simulation, whether the user is right-handed or left-handed, and so on), and a physical attribute of a virtual player (e.g., the height of a bowler in a virtual reality cricket simulation, whether the bowler is right-handed or left-handed, and so on).

As shown in step 816, the exemplary method 800 may include, on a display of the virtual reality environment viewable by a user, displaying a graphical representation of the projectile launched from the virtual player and moving according to the second trajectory.

Thus, using techniques described above, data from a live cricket match with recorded ball data (e.g., trajectory and location data) may be used in a virtual reality environment (e.g., in substantially real time). The virtual reality environment may substantially mimic the real-world setting from the live cricket match, or a different setting, where the user, as the batman, may see virtual representations from a first-person perspective including representations of themselves (e.g., their hands or gloves, their bat, a part of their helmet, and so on). In this manner, the user may view a virtual reality version of a real-world cricket ball that is bowled in the same or similar manner in a live-action cricket match. Furthermore, virtual reality simulation techniques disclosed herein may facilitate the user viewing a playback of recorded data from a live-action sequence. Thus, in implementations, a virtual reality simulation method facilitates game play with professional athletes.

As described above, for a more immersive experience, movements of a bowler from a live-action sequence such as a live cricket match may be recorded and automatically applied to a player within the virtual reality simulation. The player may thus make the same approach as a professional bowler in a live-action match, and may release a ball in the virtual reality simulation that follows the same (or similar) path as the ball in the live-action match. This may facilitate asynchronous play between fans at home and professionals around the world.

Figure 9:
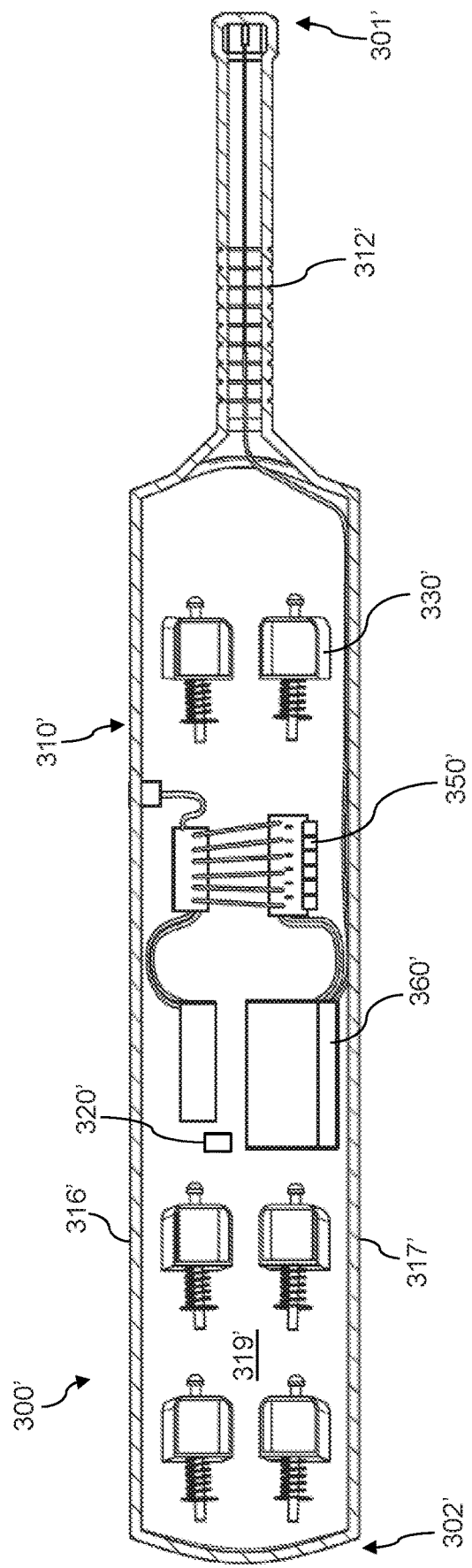
FIG. 9 is a top view of a cross-section of a bat.

While certain implementations have been described, other implementations are additionally or alternatively possible. For example, while a certain configuration of an accessory including a bat 300 is described above with reference to FIGS. 3A and 3B, other accessory configurations are additionally or alternatively possible for the bat. For example, referring now to FIG. 9, a bat 300' may include an alternate arrangement and orientation for the solenoids 330' disposed therein. For the sake of efficient description, elements with prime (') element numbers in FIG. 9 should be understood to be similar to elements with unprimed element numbers in FIGS. 3A and 3B, and are not described separately herein.

In another alternate implementation, one or more haptic feedback devices or solenoids are disposed on an exterior of an accessory. In this manner, the haptic feedback devices may be structurally configured to strike or otherwise contact an exterior surface of the accessory to provide force feedback (e.g., for replicating a projectile or other object striking the surface of the accessory).

Further, it will be understood that any of the devices, systems, and methods described herein may also or instead include other hardware such as a camera or other sensors, power sources, controls, input devices such as a keyboard, a touchpad, a computer mouse, a switch, a dial, a button, and so on, and output devices such as a display, a speaker or other audio transducer, light-emitting diodes or other lighting or display components, and the like. Other hardware may also or instead include a variety of cable connections and/or hardware adapters for connecting to, for example, external computers, external hardware, external instrumentation or data acquisition systems, and the like.

Moreover, it will be understood that any of the devices, systems, and methods described herein may also or instead include other aspects of virtual reality simulation such as those found in typical virtual reality gaming. By way of example, a virtual reality simulation described herein may score a user's performance and decisions. In the context of cricket, these scores may be based on whether to bat, the quality of the batting, and other game-related factors. In one or more embodiments, a user may repeat a sequence of virtual play or may move on to additional plays. A user's progress (or regression) over time may be tracked and monitored. The user may also or instead be able to access scores, replay scenes, as well as view and review data, for example, via a personalized summary on a webpage, mobile application, or gaming interface.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of operating a virtual reality game, the method comprising:

receiving projectile data including temporal data related to arrival of a virtual projectile within a predetermined volume adjacent to a virtual player in a virtual reality environment and spatial data related to a trajectory of the virtual projectile in the virtual reality environment;

receiving accessory data including movement of an accessory in a physical space, the accessory data corresponding to movement of a virtual accessory of the virtual player within the virtual reality environment, wherein the accessory is shaped as a bat having a handle at a first end thereof and a body extending from the handle;

determining, based on a comparison of the accessory data and the projectile data, a contact scenario between the virtual accessory and the virtual projectile within the virtual reality environment; and based on the contact scenario, selectively actuating one or more solenoids coupled to the accessory to provide haptic feedback to a user grasping the accessory at the handle, the haptic feedback simulating contact between the accessory and a projectile, wherein selectively actuating the one or more solenoids further includes defining a number of discrete contact scenarios characterizing contact between the virtual accessory and the virtual projectile within the virtual reality environment at a number of different locations on the virtual accessory and selectively actuating the one or more solenoids according to one of the number of discrete contact scenarios most closely corresponding to a contact location estimated within the virtual reality environment.

2. The method of claim 1, further comprising, when it is determined that the virtual accessory will contact the virtual projectile within the virtual reality environment, determining a contact location on the virtual accessory and a contact time based on the accessory data and the projectile data.

3. The method of claim 1, further comprising selecting audio feedback based on the contact scenario, determining timing for sending the audio feedback to a speaker to align with timing of the contact scenario, and transmitting the audio feedback to the speaker.

4. The method of claim 1, further comprising adjusting a trajectory of the virtual accessory based on additional tracked movement of the accessory.

5. The method of claim 1, further comprising simulating tracked movement of the accessory within the virtual reality environment.

6. The method of claim 1, further comprising displaying the virtual accessory and the virtual projectile on a display.

7. The method of claim 1, wherein the accessory includes a second end disposed away from the handle, a first surface bounded by a top edge and a bottom edge, and a second surface disposed opposite the first surface, wherein the first surface includes a face structurally configured to contact the projectile, and wherein the number of discrete contact scenarios include one or more of:

a first simulated contact scenario of the projectile striking a tip of the accessory defined by a distal end of the face disposed substantially adjacent to the second end of the accessory;

a second simulated contact scenario of the projectile striking a base of the accessory defined by a proximal end of the face disposed substantially adjacent to the handle;

a third simulated contact scenario of the projectile striking an upper contact area on or adjacent to the top edge of the accessory; and a fourth simulated contact scenario of the projectile striking a lower contact area on or adjacent to the bottom edge of the accessory.

8. The method of claim 1, wherein the accessory includes a second end disposed away from the handle, a first surface bounded by a top edge and a bottom edge, and a second surface disposed opposite the first surface, wherein the first surface includes a face structurally configured to contact the projectile, and wherein the number of discrete contact scenarios include one or more of:

a fifth simulated contact scenario of the projectile striking the accessory on a sweet spot on the face disposed between a centerline of the face and a distal end of the face; and a sixth simulated contact scenario of the projectile striking the accessory on a middle-hit area of the face disposed between the sweet spot and a proximal end of the face.

9. The method of claim 8, further comprising actuating all solenoids included in the one or more solenoids in a low-power mode during the fifth simulated contact scenario, and actuating all solenoids included in the one or more solenoids in a high-power mode during the sixth simulated contact scenario.

10. The method of claim 1, wherein selectively actuating the one or more solenoids further includes defining a discrete contact scenario characterizing contact between the virtual accessory and the virtual projectile within the virtual reality environment according to one or more of: (i) a location where the virtual accessory made contact with the virtual projectile, (ii) a speed of the virtual projectile, (iii) a spin of the virtual projectile, (iv) a speed of the accessory in the physical space, (v) an angle of the accessory in the physical space, (vi) an exit speed of the virtual projectile after contact with the virtual accessory, and (vii) an exit angle of the virtual projectile after contact with the virtual accessory.

11. The method of claim 1, wherein at least one of the one or more solenoids is disposed within the handle of the accessory.

12. The method of claim 1, wherein at least one of the one or more solenoids is coupled to the handle of the accessory.

13. The method of claim 1, further comprising executing a virtual reality cricket game within the virtual reality environment, and rendering a position of the accessory within the virtual reality cricket game in substantially real time.

14. The method of claim 1, wherein each of the one or more solenoids is positioned in a predetermined orientation within the accessory.

15. The method of claim 14, wherein the predetermined orientation of at least one of the one or more solenoids is substantially normal to a plane of a face of the accessory.

16. The method of claim 14, wherein the predetermined orientation of at least one of the one or more solenoids has an axis of linear actuation of about 35 degrees offset from a plane of a surface of the accessory.

17. The method of claim 1, further comprising contacting a contact surface of the accessory with at least one of the one or more solenoids based on the contact scenario, the contact surface disposed adjacent to the at least one of the one or more solenoids.

18. The method of claim 1, further comprising monitoring a physical space to detect a tracking device of the accessory for receiving the accessory data.

19. A method of operating a virtual reality game, the method comprising:

receiving projectile data including temporal data related to arrival of a virtual projectile within a predetermined volume adjacent to a virtual player in a virtual reality environment and spatial data related to a trajectory of the virtual projectile in the virtual reality environment;

receiving accessory data including movement of an accessory in a physical space, the accessory data corresponding to movement of a virtual accessory of the virtual player within the virtual reality environment, wherein the accessory is shaped as a bat having a handle at a first end thereof and a body extending from the handle;

determining, based on a comparison of the accessory data and the projectile data, a contact scenario between the virtual accessory and the virtual projectile within the virtual reality environment; and based on the contact scenario, selectively actuating one or more solenoids coupled to the accessory to provide haptic feedback to a user grasping the accessory at the handle, the haptic feedback simulating contact between the accessory and a projectile, wherein each of the one or more solenoids is positioned in a predetermined orientation within the accessory, and wherein the predetermined orientation of at least one of the one or more solenoids is substantially normal to a plane of a face of the accessory.

20. A method of operating a virtual reality game, the method comprising:

receiving projectile data including temporal data related to arrival of a virtual projectile within a predetermined volume adjacent to a virtual player in a virtual reality environment and spatial data related to a trajectory of the virtual projectile in the virtual reality environment;

receiving accessory data including movement of an accessory in a physical space, the accessory data corresponding to movement of a virtual accessory of the virtual player within the virtual reality environment, wherein the accessory is shaped as a bat having a handle at a first end thereof and a body extending from the handle;

determining, based on a comparison of the accessory data and the projectile data, a contact scenario between the virtual accessory and the virtual projectile within the virtual reality environment; and based on the contact scenario, selectively actuating one or more solenoids coupled to the accessory to provide haptic feedback to a user grasping the accessory at the handle, the haptic feedback simulating contact between the accessory and a projectile, wherein each of the one or more solenoids is positioned in a predetermined orientation within the accessory, and wherein the predetermined orientation of at least one of the one or more solenoids has an axis of linear actuation of about 35 degrees offset from a plane of a surface of the accessory.

* * * * *